(12) United States Patent
Cohen et al.

(10) Patent No.: US 11,347,045 B2
(45) Date of Patent: May 31, 2022

(54) PTYCHOGRAPHY BASED SYSTEM AND METHOD

(71) Applicant: TECHNION RESEARCH AND DEVELOPMENT FOUNDATION LTD., Haifa (IL)

(72) Inventors: Oren Cohen, Haifa (IL); Gil Ilan Haham, Haifa (IL); Pavel Sidorenko, Haifa (IL); Oren Lahav, Adi (IL); Or Peleg, Adi (IL); Bing Kuan Chen, Keelung (TW)

(73) Assignee: TECHNION RESEARCH AND DEVELOPMEN T FOUNDATION LTD., Haifa (IL)

( * ) Notice: Subject to any disclaimer, the term of this patent is extended or adjusted under 35 U.S.C. 154(b) by 277 days.

(21) Appl. No.: 16/493,469

(22) PCT Filed: Mar. 13, 2018

(86) PCT No.: PCT/IL2018/050296
§ 371 (c)(1),
(2) Date: Sep. 12, 2019

(87) PCT Pub. No.: WO2018/167786
PCT Pub. Date: Sep. 20, 2018

(65) Prior Publication Data
US 2020/0142175 A1 May 7, 2020

Related U.S. Application Data

(60) Provisional application No. 62/482,237, filed on Apr. 6, 2017, provisional application No. 62/470,797, filed on Mar. 13, 2017.

(51) Int. Cl.
*H04N 9/47* (2006.01)
*G02B 21/36* (2006.01)
*G02B 21/00* (2006.01)

(52) U.S. Cl.
CPC ....... *G02B 21/367* (2013.01); *G02B 21/0032* (2013.01); *G02B 21/0084* (2013.01)

(58) Field of Classification Search
CPC .............. G02B 21/367; G02B 21/0032; G02B 21/0084
(Continued)

(56) References Cited

U.S. PATENT DOCUMENTS

2002/0089740 A1    7/2002   Wetzel et al.

FOREIGN PATENT DOCUMENTS

WO      2015/179452 A1    11/2015
WO      2016/020684 A1     2/2016
WO      WO2016/123508 A1   8/2016

OTHER PUBLICATIONS

Sodorenko et. al: "Single-shot ptychography". Optica, vol. 3, No. 1, Dec. 23, 2015, p. 9.
(Continued)

*Primary Examiner* — William Choi
(74) *Attorney, Agent, or Firm* — Browdy and Neimark, P.L.L.C.

(57) ABSTRACT

A ptychography system is presented for imaging an object located in an object plane. The ptychography system comprises an optical system, and a detection device. The optical system comprises a single shot ptychography arrangement configured and operable to create light response patterns from the object in the object plane on a pixel matrix of the detection device during the same exposure session of the detection device, wherein the optical system further comprises at least one light coding device configured and operable to apply at least one predetermined coding function to at least one of illuminating light and the light response of the object being collected, and said detection device is configured and operable with a predetermined duration of
(Continued)

the exposure session during which the pixel matrix detects the collected light, such that image data indicative of the detected light during a single exposure session is in the form of a coded light response of the object being illuminated.

28 Claims, 21 Drawing Sheets

(58) Field of Classification Search
USPC .......................................................... 348/79
See application file for complete search history.

(56) References Cited

OTHER PUBLICATIONS

Hoppe Robert et al: "Full characterization of a focused wave field with sub 100 nm resolution", Proceedins of SPIE, IEEE, US, vol. 8778, May 8, 2013, p. 877880G.
Byounghyo Lee et al: "One-Shot Light Field Fourier Ptychographic Microscopy for Complex Imaging", Imaging ans Applied optics 2016, Jan. 1, 2016, p. JT3A.54.
Holloway Jason et al: "Toward Long-Distance Subdiffraction Imaging Using Coherent Camera Arrays", IEEE Transactions on Computational Imaging, IEEE, vol. 2, No. 3, Sep. 1, 2016, pp. 251-265.
K. Nakagawa, A. Iwasaki, Y. Oishi, R. Horisaki, A. Tsukamoto, A. Nakamura, K. Hirosawa, H. Liao, T. Ushida, K. Goda, F. Kannari, and I. Sakuma, "Sequentially timed all-optical mapping photography (STAMP)," Nat. Photonics 8(9), 695-700 (2014).
L. Gao, J. Liang, C. Li, and L. V. Wang, "Single-shot compressed ultrafast photography at one hundred billion frames per second," Nature 516(7529), 74-77 (2014).
X. Chen, J. Wang, M. Versluis, N. de Jong, and F. S. Villanueva, "Ultra-fast bright field and fluorescence imaging of the dynamics of micrometer-sized objects," Rev. Sci. Instrum. 84(6), 063701 (2013).
K. Goda, K. K. Tsia, and B. Jalali, "Amplified dispersive Fourier-transform imaging for ultrafast displacement sensing and barcode reading," Appl. Phys. Lett. 93(13), 131109 (2008).
C. Lei, B. Guo, Z. Cheng, and K. Goda, "Optical time-stretch imaging: Principles and applications," Appl. Phys. Rev. 3 (1), 011102 (2016).
P. Sidorenko and O. Cohen, "Single-shot ptychography," Optica 3(1), 9 (2016).
P. Thibault and A. Menzel, "Reconstructing state mixtures from diffraction measurements," Nature 494(7435), 68-71 (2013).
P. Li, T. Edo, D. Batey, J. Rodenburg, and A. Maiden, "Breaking ambiguities in mixed state ptychography," Opt. Express 24(8), 9038-9052 (2016).
J. M. Rodenburg and H. M. L. Faulkner, "A phase retrieval algorithm for shifting illumination," Appl. Phys. Lett. 85, 4795-4797 (2004).
A. M. Maiden and J. M. Rodenburg, "An improved ptychographical phase retrieval algorithm for diffractive imaging," Ultramicroscopy 109, 1256-1262 (2009).
P. Sidorenko, O. Lahav, Z. Avnat, and O. Cohen, "Ptychographic reconstruction algorithm for frequency-resolved optical gating: super-resolution and supreme robustness," Optica, vol. 3, No. 12, p. 1320, Dec. 2016.
Karl et al. Spatial, spectral, and polarization multiplexed phychography, Optics Express, vol. 23, Issue 23, pp. 30250-30258, Nov. 1, 2015—Abstract only.

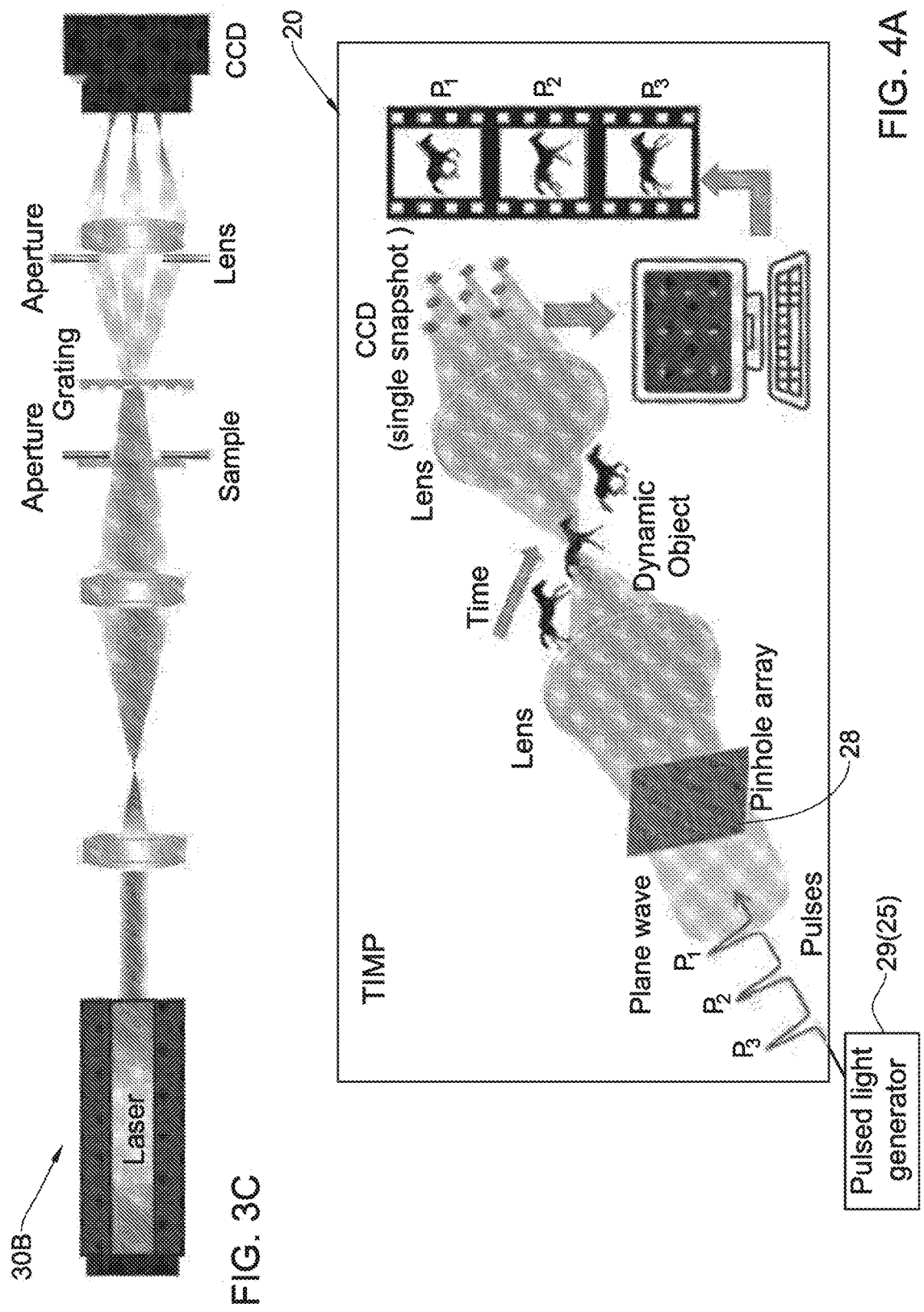

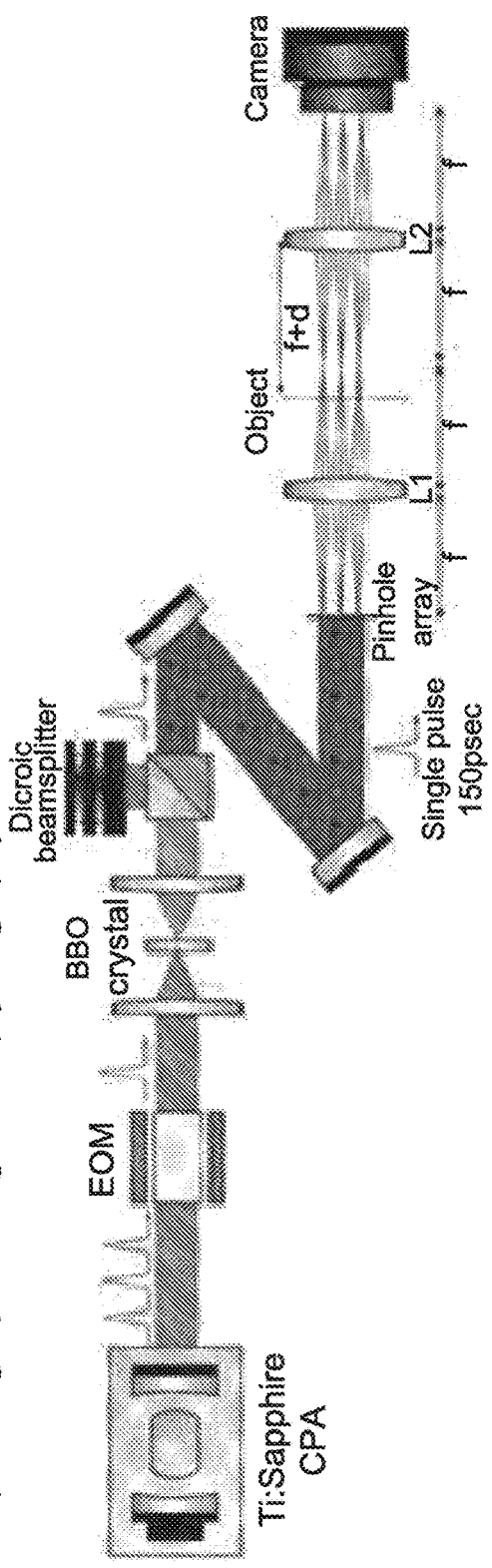
FIG. 8A  Setup of single-pulse single-shot ptychography
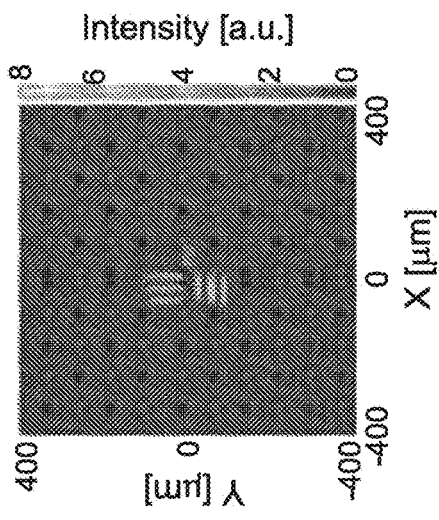
FIG. 8D
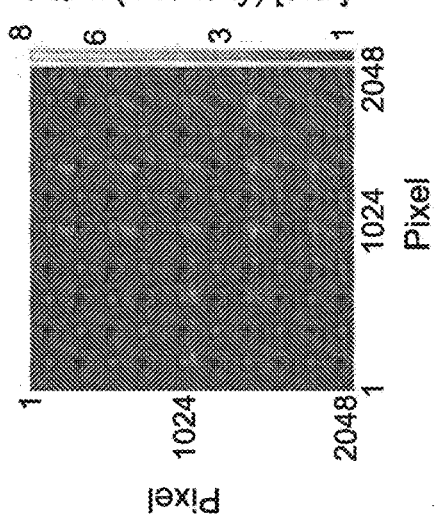
FIG. 8C
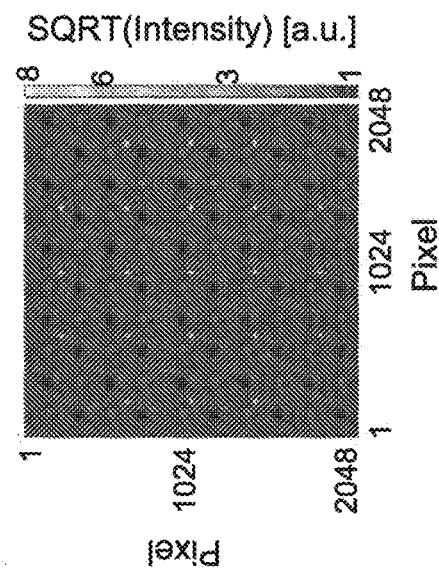
FIG. 8B

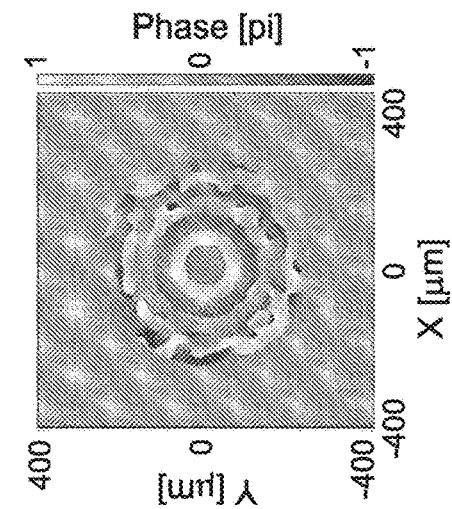
FIG. 8E　FIG. 8F　FIG. 8G
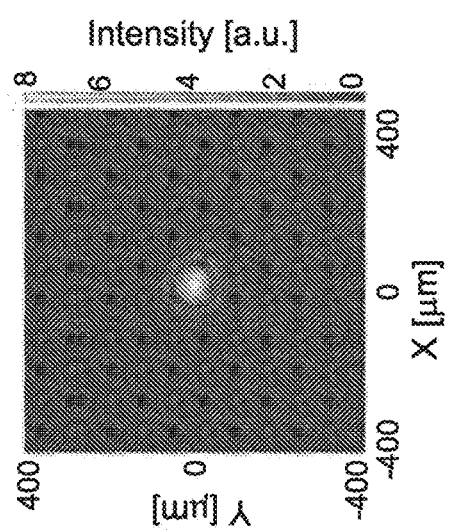
FIG. 9A Single-shot ptychography
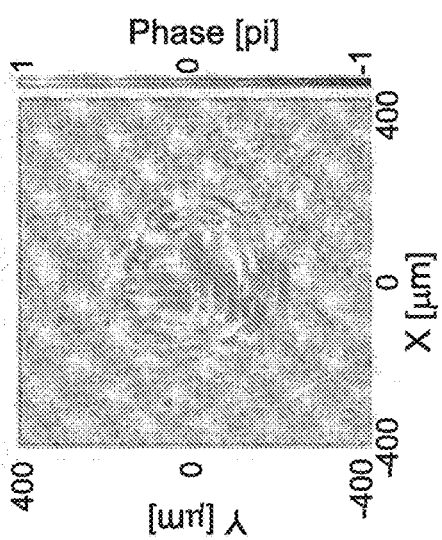
FIG. 9B Single-shot ptychography TIMP

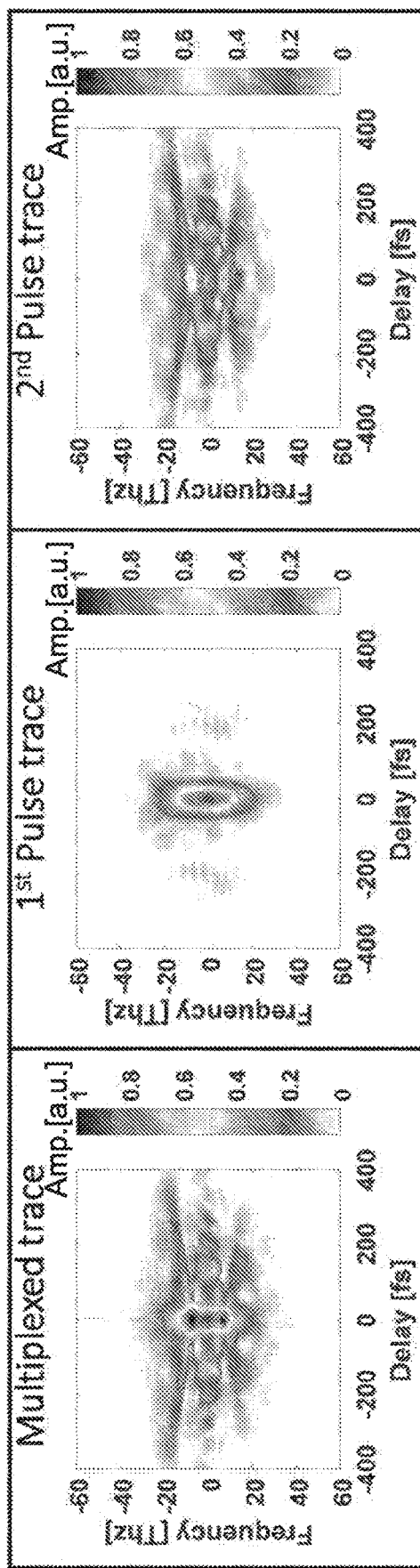
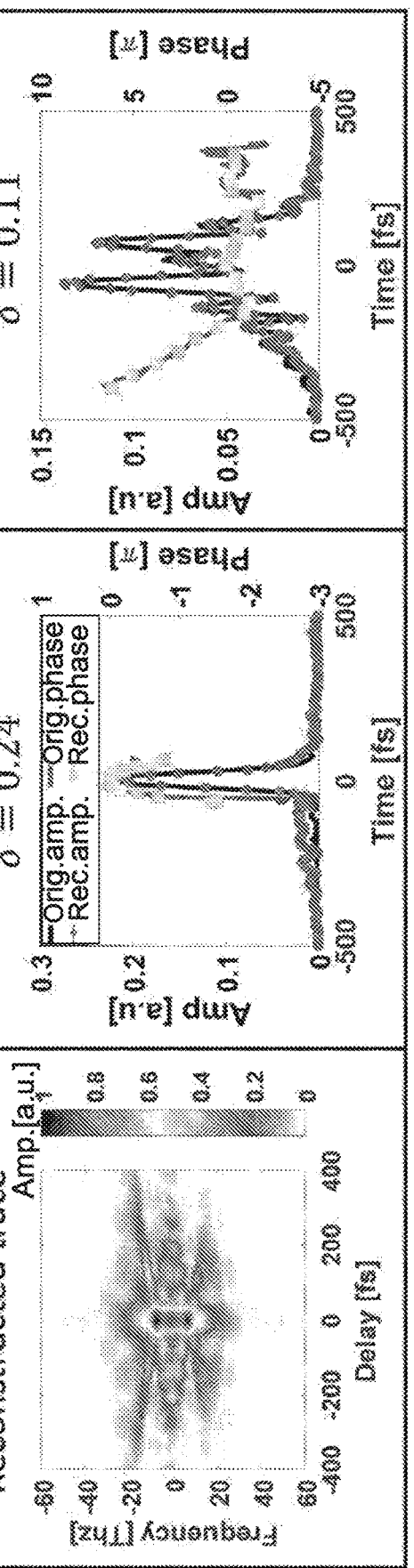
FIG. 16A  FIG. 16B  FIG. 16C
FIG. 16D  FIG. 16E  FIG. 16F

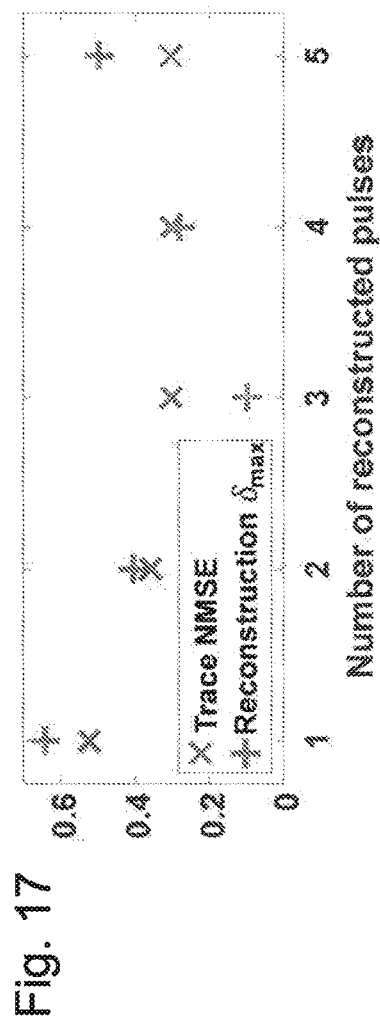
Fig. 17
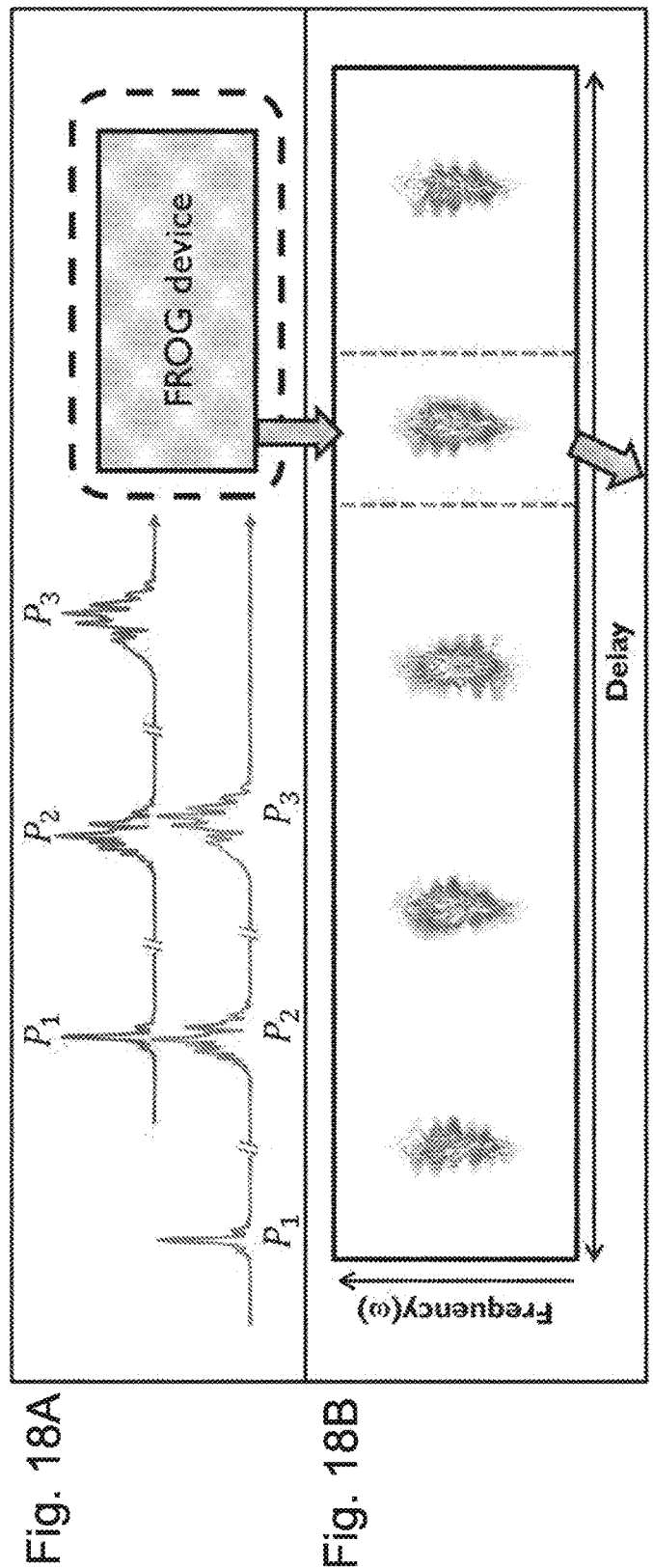
Fig. 18A
Fig. 18B

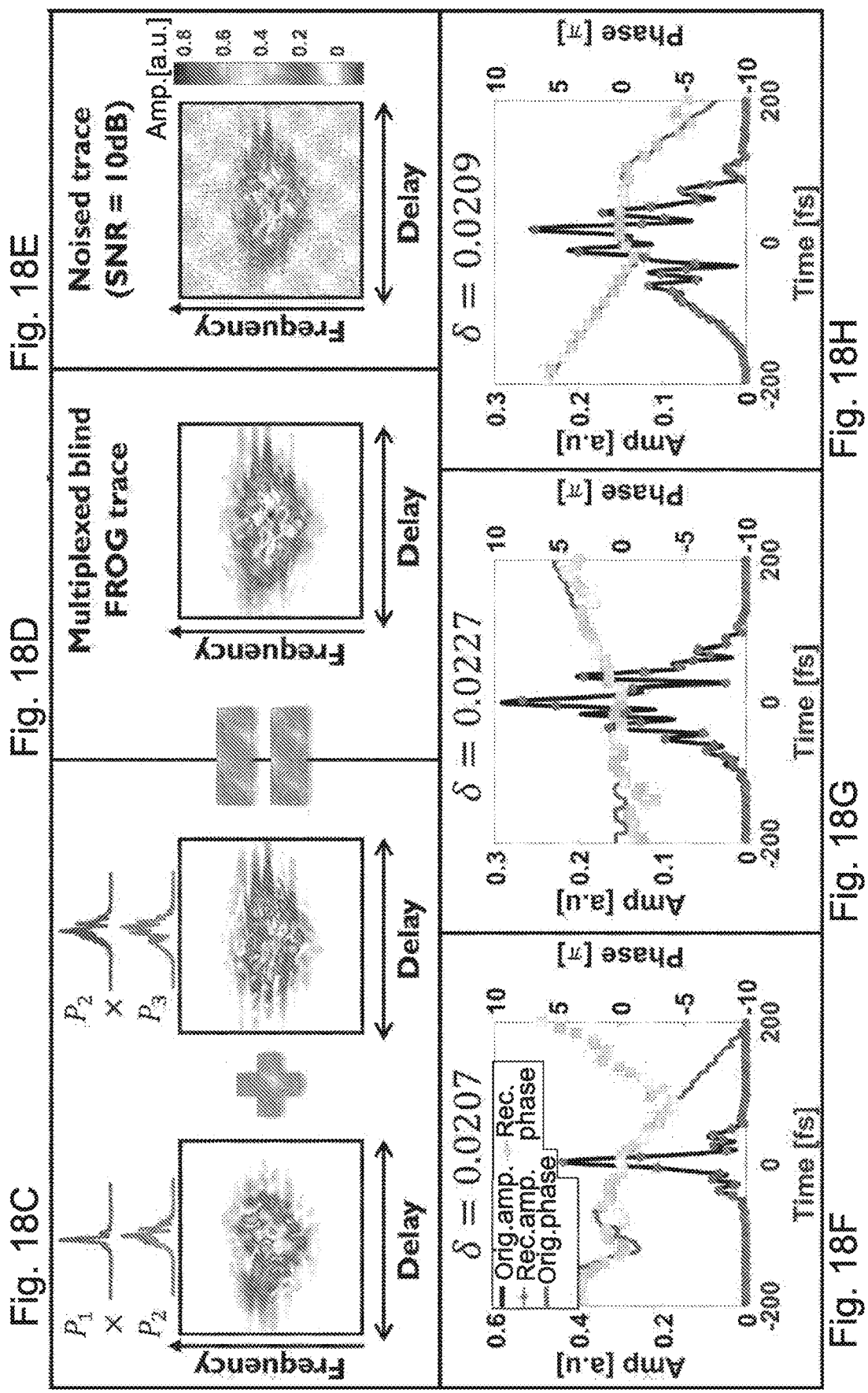

PTYCHOGRAPHY BASED SYSTEM AND METHOD

TECHNOLOGICAL FIELD

The present invention is in the field of imaging techniques, and is specifically relevant for imaging of non-repetitive ultrafast dynamical objects.

BACKGROUND ART

References considered to be relevant as background to the presently disclosed subject matter are listed below:
1. K. Nakagawa, A. Iwasaki, Y. Oishi, R. Horisaki, A. Tsukamoto, A. Nakamura, K. Hirosawa, H. Liao, T. Ushida, K. Goda, F. Kannari, and I. Sakuma, "Sequentially timed all-optical mapping photography (STAMP)," Nat. Photonics 8(9), 695-700 (2014).
2. L. Gao, J. Liang, C. Li, and L. V. Wang, "Single-shot compressed ultrafast photography at one hundred billion frames per second," Nature 516(7529), 74-77 (2014).
3. 10. X. Chen, J. Wang, M. Versluis, N. de Jong, and F. S. Villanueva, "Ultra-fast bright field and fluorescence imaging of the dynamics of micrometer-sized objects," Rev. Sci. Instrum. 84(6), 063701 (2013).
4. K. Goda, K. K. Tsia, and B. Jalali, "Amplified dispersive Fourier-transform imaging for ultrafast displacement sensing and barcode reading," Appl. Phys. Lett. 93(13), 131109 (2008).
5. C. Lei, B. Guo, Z. Cheng, and K. Goda, "Optical time-stretch imaging: Principles and applications," Appl. Phys. Rev. 3(1), 011102 (2016).
6. P. Sidorenko and O. Cohen, "Single-shot ptychography," Optica 3(1), 9 (2016).
7. P. Thibault and A. Menzel, "Reconstructing state mixtures from diffraction measurements," Nature 494(7435), 68-71 (2013).
8. P. Li, T. Edo, D. Batey, J. Rodenburg, and A. Maiden, "Breaking ambiguities in mixed state ptychography," Opt. Express 24(8), 9038-9052 (2016).
9. J. M. Rodenburg and H. M. L. Faulkner, "A phase retrieval algorithm for shifting illumination," Appl. Phys. Lett. 85, 4795-4797 (2004).
10. A. M. Maiden and J. M. Rodenburg, "An improved ptychographical phase retrieval algorithm for diffractive imaging," Ultramicroscopy 109, 1256-1262 (2009).
11. P. Sidorenko, O. Lahav, Z. Avnat, and O. Cohen, "Ptychographic reconstruction algorithm for frequency-resolved optical gating: super-resolution and supreme robustness," *Optica*, vol. 3, no. 12, p. 1320, December 2016.

Acknowledgement of the above references herein is not to be inferred as meaning that these are in any way relevant to the patentability of the presently disclosed subject matter.

BACKGROUND

Ptychography is a scanning coherent diffractive imaging (CDI) technique that has recently gained remarkable momentum in optical microscopy in the visible, extreme ultraviolet and x-ray spectral regions, as well as in electron microscopy and other applications, e.g. optical encryption. Ptychography is attractive for bio-imaging and phase imaging because it can provide a label free, high-contrast, quantitative amplitude and phase information.

One of important properties of imaging systems is the frame rate. This is more critical for imaging non-repetitive ultrafast dynamical objects (generally, fast occurring phenomena). This is because imaging of non-repetitive ultrafast dynamical objects requires complicated ultrahigh-speed cameras or microscopes (as compared to the known pump-probe techniques employed for exploring repetitive ultrafast events). Ultrahigh-speed imaging techniques are essential for many applications in scientific research, including plasma physics, chemistry, phononics, spintronics, fluidics, and life science, as well as for technology developments, clinical diagnostics and monitoring industrial processes.

Electronic imaging sensors based on a charge-coupled device (CCD) or complementary metal-oxide-semiconductor (CMOS) technology provide highspeed imaging, enabling acquisition rates of up to $10^7$ frames per second. Further increase in the frame rate using CCD or CMOS technology is limited by their on-chip storage and electronic readout speed.

Various optical imaging techniques have been developed to allow frame rates that exceed the limits posed by the detectors. For example, the technique known as sequentially timed all-optical mapping photography provides a frame rate up to 4.4 THz for 6 frames [1]. This technique is based on all-optical mapping onto a burst stream of sequentially timed photographs with spatial and temporal dispersion. In compressed ultrafast photography, the image is reconstructed from a single scan of a streaking camera with open slit using compressed sensing approach [2], 350 frames at 100 GHz frame rate were demonstrated. Also known are systems based on rotating mirror [3] which directs the incoming image through a group of lens pairs to a group of CCD cameras. Further, a time stretch imaging [4] has been developed, which is built on temporally stretching broadband pulses by dispersive properties of light in both spatial and temporal domains. This technique provides continuous image acquisition at an ultrahigh frame rate of up to 1 GHz [5].

GENERAL DESCRIPTION

There is a need in the art for a novel imaging technique providing ultrahigh-speed imaging suitable for imaging non-repetitive ultrafast dynamical objects.

In fact, the above-mentioned known techniques add significant complexity to an imaging system, which for many applications is not possible or is not desired. Moreover, the required complicated modules inevitably introduce new limitations. The frame rate in these techniques is generally strongly and negatively coupled with the spatial resolution and/or field of view. Also, they do not yield full characterization of complex (amplitude and phase) objects which, for example, is extremely important in live cells and magnetic imaging. Also, it is technically very challenging to apply these techniques in the short wavelengths spectral regions, including extreme UV and x-rays.

The present invention provides a novel ultrahigh-speed imaging approach that is based on ptychography. In ptychography, a complex-valued object is scanned in a stepwise fashion through a localized coherent illumination. In each scanning step, the far-field diffraction pattern of the object is measured, typically in a Fraunhofer plan. The set of diffraction patterns is used for reconstructing a complex transfer function describing the object. Critically, the illumination spot in each step overlaps substantially with neighboring spots. Thus, the recorded information is highly redundant, leading to several advantages of ptychography over ordinary coherent diffraction imaging including improved robustness to noise, no requirement for prior information (e.g. support)

on the object, reconstructions of both the imaged sample and the probe beam simultaneously, and generally faster and more reliable reconstruction algorithms.

Recently, Single-Shot Ptychography (SSP) technique has been developed [6], where the required multiple far-field intensity patterns from overlapped regions in the sample are recorded simultaneously in a single CCD exposure.

The novel technique of the present invention utilizes the principles of single-shot ptychography, and provides a novel single-exposure ptychography system, which may be used for imaging "static" or "dynamic" objects. In this connection, it should be noted that the term "dynamic object" used herein refers to an object whose state dynamically changes in either repetitive or non-repetitive manner during an exposure session.

It should also be noted that the principles of the invention for imaging dynamic objects may be implemented using an optical scheme of a single shot ptychography system of any known suitable configuration, including ptychography and Fourier ptychography based configurations. Examples of such known single shot ptychography and single shot Fourier ptychography setups are shown schematically in FIGS. 3A and 3B and are described further below.

According to the present invention, the ptychography system includes an optical system and a detection device having one or more pixel matrices, where the optical system includes a single-shot ptychography arrangement (scheme), and at least one light coding device. It should be noted that the single shot ptychography arrangement may be of any known suitable SSP (or FSSP) scheme, or a novel scheme of the invention can be used, which is described below. Generally, the single shot ptychography arrangement is configured and operable to create light response patterns from the object in the object plane on a pixel matrix of the detection device during the same exposure session of the detection device. Such light response patterns are diffraction patterns in SSP and are multiple images in FSSP. It should therefore be understood that the expression "single shot ptychography arrangement" or "single shot ptychography scheme" should be interpreted properly. The light coding device used in the invention applies at least one predetermined coding function to either one or both of illuminating light and light response of the object, such that image data indicative of the detected light response during a single exposure session of the detection device is in the form of a coded light response of the object being illuminated.

Thus, in some embodiments of the invention, the novel technique of the present invention utilizes ptychographical information multiplexing in single-shot ptychography that is illuminated by a burst of pulses. In this connection, it should be noted that such burst of pulses may be produced by a pulsed light source, or may alternatively be produced by a CW light source (e.g. laser) and a spatial light modulator (SLM). Generally speaking, the object illumination may be such that each exposure session includes a series of multiple temporal frames of the object resulting in a single intensity pattern recorded by the detection device, by either a single 2D pixel array or two or more such pixel arrays forming together a pixel matrix that records the intensity in a single exposure session. The inventors termed the technique of these embodiments as "Time-resolved Imaging by Multiplexed Ptychography (TIMP). In this technique, complex-valued multiple frames of the object are recovered from the image data measured using a single pixel-matrix exposure (by one or multiple CCDs, but in the single shot/exposure session) in a single-shot ptychography (SSP) system. The framerate and temporal resolution in TIMP are determined by an illumination device, and not the imaging system, making this method very flexible. It should be noted that the TIMP imaging system utilizes simple elements, hence it can be implemented across the electromagnetic spectrum (including extreme UV and x-rays), as well as with other waves.

The inventors have shown numerically recovery of 15 different complex frames from a single noisy camera snapshot. Also, the inventors have shown experimentally static imaging with a SSP system and single short laser pulse illumination. The TIMP technique of the invention, due to its simplicity and versatility, can be used in numerous ultra-high-speed imaging applications, as well as can be used for imaging at sub-femtosecond frame time by using a burst of attosecond pulses.

According to one broad aspect of the invention, it provides a ptychography system for imaging an object located in an object plane, the ptychography system comprising an optical system, and a detection device, the optical system comprising a single shot ptychography arrangement configured and operable to create diffraction light response patterns from the object in the object plane on a pixel matrix of the detection device during the same exposure session of the detection device, wherein the optical system further comprises at least one light coding device configured and operable to apply at least one predetermined coding function to at least one of illuminating light and the light response of the object being collected, and said detection device is configured and operable with a predetermined duration of the exposure session during which the pixel matrix detects the collected light, such that image data indicative of the detected light during a single exposure session is in the form of a coded light response of the object being illuminated.

In some embodiments, the optical system comprises the light coding device configured and operable to produce the illuminating light having a predetermined time pattern thereby producing the light response in the form of corresponding temporal frames of the multiplexed light responses detected by the pixel matrix during the same exposure session, thereby providing time-resolved imaging of the multiplexed light responses of the object during the single exposure session, thereby enabling imaging of a dynamic object.

For example, the illuminating light is in the form of a burst of pulses. Also, the illuminating light might have a predetermined spatial pattern. preferably, each pulse in the burst of pulses is different from other pulses in the burst in at least one of a pulse shape, spectral characteristics, polarization state, spatial structure.

The ptychography system also comprises (e.g. is connectable to) a control system configured and operable to receive the image data indicative of the coded light response of the object during the exposure session, and utilize data indicative of the at least one predetermined coding function, to extract image data of the object.

In some embodiments, the single shot ptychography arrangement is configured and operable to produce structured light in the form of an array of illuminating beams partially overlapping at the object plane, such that the illuminating light having the predetermined time pattern forms a series of predetermined spatial patterns in the object plane; thereby providing that each spatial pattern is projected on a different region at the pixel matrix.

In some embodiments, the optical system comprises a pulse generator and a multiplexer producing together the illuminating light in the form of the burst of pulses, each pulse forming a spatial pattern in the object plane.

In some embodiments, the optical system comprises a two-dimensional array of optical windows located in an optical path of the burst of pulses. The array of optical windows may include at least one of the following: a pinhole array, an array of fibers, and a Micro Lens Array (MLA).

In some embodiments, the optical system comprises a light source and a two-dimensional array of multi-mode fibers, thereby producing different spatial modes of light separated in time, resulting in the train/burst of pulses exiting the array of fiber, where each pulse has a different spatial mode. In some other embodiments, the optical system comprises a light source and a single multi-mode fiber at the output of the light source providing different spatial modes separated in time; and the multiplexing assembly comprises a two-dimensional Micro Lens Array (MLA).

The pulses may be of certain polarization, and the optical windows may thus be polarization sensitive to encode each pulse into two polarizations with different spatial profiles. In this case, the optical system further comprises a birefringent media that separates the two polarizations into two separate pulses, each with different polarization.

Generally, the desired temporal and/or spatial profile of the illuminating light may be produced by using a light source and a spatial light modulator at the output of the light source. The spatial light modulator may be configured and operable to affect light generated by the light source to produce illuminating light in the form of burst of pulses, where each pulse may be of a spatial structure different from other pulses.

In some embodiments, the optical system comprises: a beam splitting arrangement comprising: at least one beam splitter, wherein each beam splitter divides the illuminating light into first and second specially separated light components propagating along first and second arms of the illuminating channel, and the light coding device further comprising first and second coders in the first and second arms, respectively, the first and second light coders being configured and operable to apply to said first and second light components, respectively, predetermined first and second different diffraction patterns; and a beam combining arrangement configured for combining first and second coded light components from the first and second arms to illuminate the object with light of different diffraction patterns.

It should be understood that the term "beam splitting arrangement", as well as "beam splitter" should be interpreted broadly referring to any known suitable replica creating arrangement that splits a light beam into two or more replicas or approximately replicas thereof.

In some embodiments, the detection device comprises a single detector having the pixel matrix; or the detection device comprises two or more detectors, each having a two-dimensional array of pixels, forming together the pixel matrix.

In some embodiments, the optical system comprises a beam splitter arrangement and a beam combining arrangement comprising at least one beam splitter, each dividing the light response being collected into first and second specially separated light components, and the light coding device comprises at least one pair of first and second coders in the optical paths of the first and second light components, respectively, the first and second light coders being configured and operable to apply to said first and second light components, respectively, predetermined first and second different diffraction patterns, such that each of the first and second diffraction patterns causes that different diffracted intensity patterns of sections of the respective light component arrive to different zones of the respective 2D pixel array.

Generally, the optical system may comprise a beam splitting arrangement, configured and operable for splitting the light response being collected from the object into K different arms (K≥2) light components propagating towards respective K 2D arrays of pixels; each of the K arms comprising a light coding device configured and operable to apply predetermined different spatial coding function to the respective light component of the light response being collected, and a Fourier transforming lens.

The invention, in its another broad aspect provides a single shot ptychography system for imaging an object located in an object plane, the system comprising: an optical system, and a detection device comprising two or more detectors, each having a pixel matrix, wherein the optical system comprises a beam splitting and beam combining arrangement comprising at least one beam splitter, each dividing light response of an object under illumination into first and second specially separated light components propagating to first and second pixel matrices, respectively, and a light coding device comprising at least one pair of first and second light coders in optical paths of the first and second light components, respectively, the first and second light coders being configured and operable to apply to said first and second light components, respectively, predetermined first and second different diffraction patterns, such that each of the first and second diffraction patterns causes that different diffracted intensity patterns of sections of the respective light component arrive to different zones of the respective pixel matrix.

Also, the invention provides a combined system formed by the above described ptychography system and a Frequency Resolved Optical Gating (FROG) system. The FROG system is configured and operable for recovering multiple pulses from a single multiplexed FROG trace. The system thus includes a beam splitting arrangement configured and operable to split the light response being collected into first and second light components propagating along two spatially separated paths to interact respectively, with the single shot ptychography arrangement and FROG system.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 3A-3C illustrate schematically the configuration and operation of two examples of the known SSP systems;

FIGS. 4A and 4B illustrate two specific examples of the ptychography system of the present invention configured to implement the TIMP technique of the invention for complex imaging and reconstruction of a "dynamic" object;

FIGS. 8A-8G illustrate experimental results of a single-pulse SSP proving that (spectrally wide) ultrashort laser pulse with limited flux can be used in SSP, wherein FIGS. 8B and 8C show measured diffraction patterns without and with the object respectively; FIGS. 8D and 8E display the reconstructed intensity and phase of the object, respectively, and FIGS. 8F and 8G show the reconstructed probe beam intensity and phase, respectively;

FIGS. 9A and 9B show two examples, respectively, of novel single-exposure ptychography systems, configured without and with the TIMP feature, respectively;

FIG. 11C and FIGS. 12A-12F show numerically demonstration of a technique of the present invention for reconstruction of multiple pulses from a multiplexed FROG trace, wherein FIG. 11C shows average Root Mean Square Error (RMSE) as a function of number of pulses for different noise levels, and FIGS. 12A-12F show the results of recovery in a numerical example of characterizing 3 pulses from a single multiplexed FROG trace (which corresponds to the sum of the 3 FROG traces that are associated with the 3 pulses);

FIG. 13A shows a burst of three pulses with the duration of each pulse being much smaller (shorter) than the time interval between them, FIG. 13B shows SHG-FROG traces which are generated from each pulse separately; and FIG. 13C shows a multiplexed FROG trace, that corresponds to the sum of the three individual traces depicted in FIG. 13B;

FIGS. 16A-16F is the experimental demonstration of multiplexed FROG;

FIG. 17 shows an example of a method to deduce the number of pulses in the burst from the multiplexed FROG trace;

FIGS. 18A-18H show an example for a multiplexed blind FROG trace concept and numerical reconstruction.

DETAILED DESCRIPTION OF EMBODIMENTS

Figure 1:
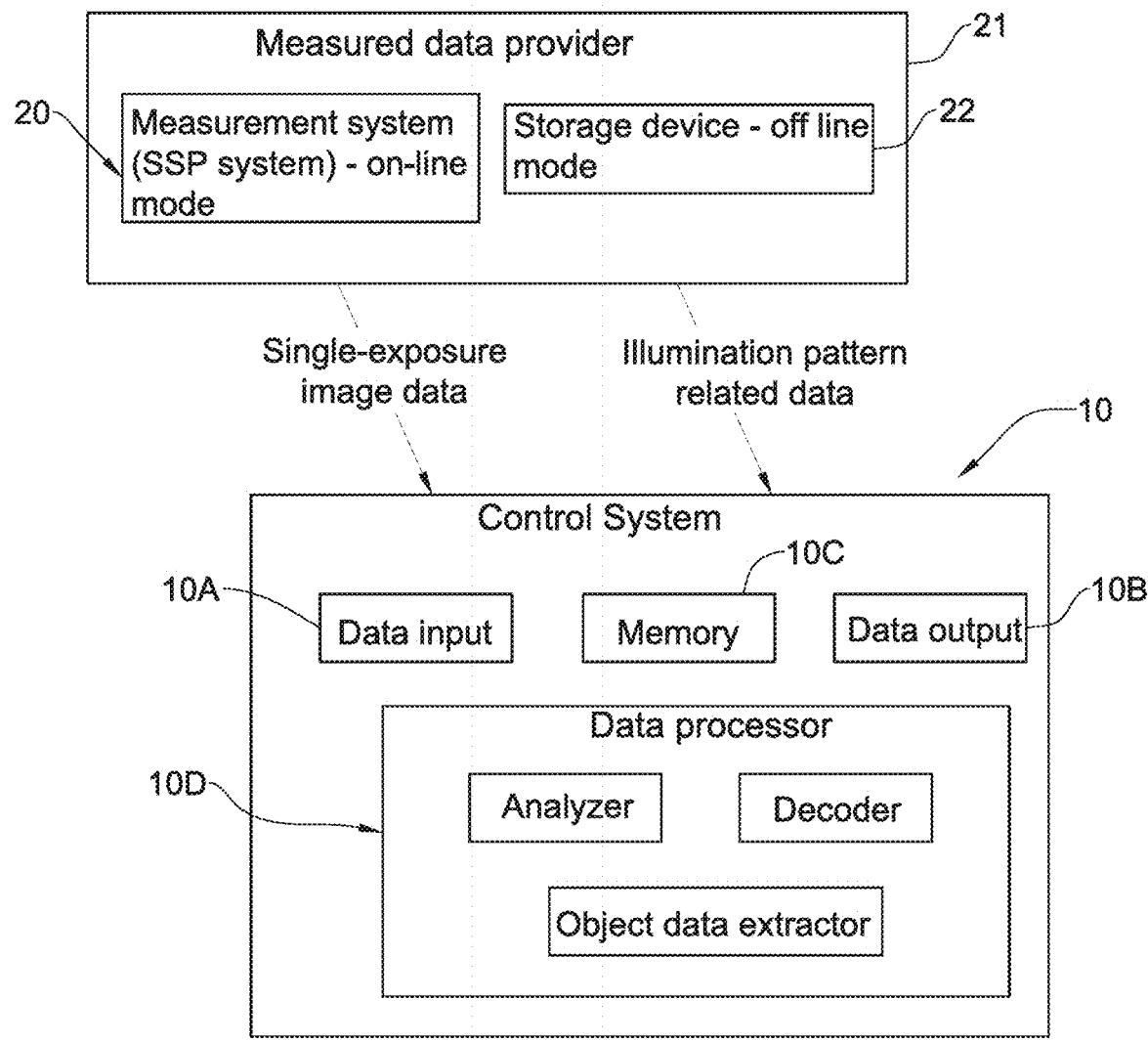
FIG. 1 is a block diagram of a control system configured according to an embodiment of the invention, for use with a ptychography system of the invention utilizing a combination of SSP and TIMP.

Reference is made to FIG. 1, which illustrates, by way of a block diagram, a control system 10 configured and operable according to the invention for receiving and processing image data obtained by an SSP imaging system 20 of the invention utilizing the concept of TIMP technique. The control system 10 is typically a computer system comprising such main hardware/software utilities as data input 10A, data output 10B, memory 10C, and data processor 10D. It should be understood that image data to be processed by the control system 10 is received from/provided by a measured data provider 21, which may be the SSP system 20 itself (on-line object reconstruction mode) and/or a storage device 22 (off-line operational mode), which may be either a separate device or a part of the SSP system. The computer system 10 may thus be configured for data communication (e.g. via a communication network) with the measured data provider 30.

The data processor 10D is configured and operable to process input image data and generate output data indicative of the reconstructed object. The construction and operation of the data processor module 10D will be described more specifically further below. The input image data used for the object reconstruction is indicative of intensity pattern detected by a pixel matrix (that of a single camera or formed by two or more 2D pixel arrays of respectively, two or more cameras) during a single exposure session. In this specific non-limiting example the TIMP aspect of the invention is being used, and such intensity pattern is encoded by a coded illumination pattern during the exposure session. More specifically, the detected intensity pattern is indicative of a series of image data pieces (frames) detected from the object while under illumination with a predetermined illumination pattern. The input data may thus also include illumination pattern related data. As will be described further below, such illumination pattern applies predetermined coding to intensity pattern detected within a single exposure session of the measurement system. Generally, a certain coding function is applied to illuminating light and/or light response of an object being illuminated.

The data processor 10D is preprogrammed to apply to the image data indicative of the detected intensity pattern a reconstruction algorithm. Examples of such reconstructions algorithms are described below. The data processor 10D includes an analyzer utility configured and operable to identify a type of coding (e.g. temporal, spatial, optical) embedded in the image data (in the simplest example, the illumination related data (code) is known a priori), and a decoding utility configured and operable to utilize the coding data to reconstruct the object data.

Figure 2:
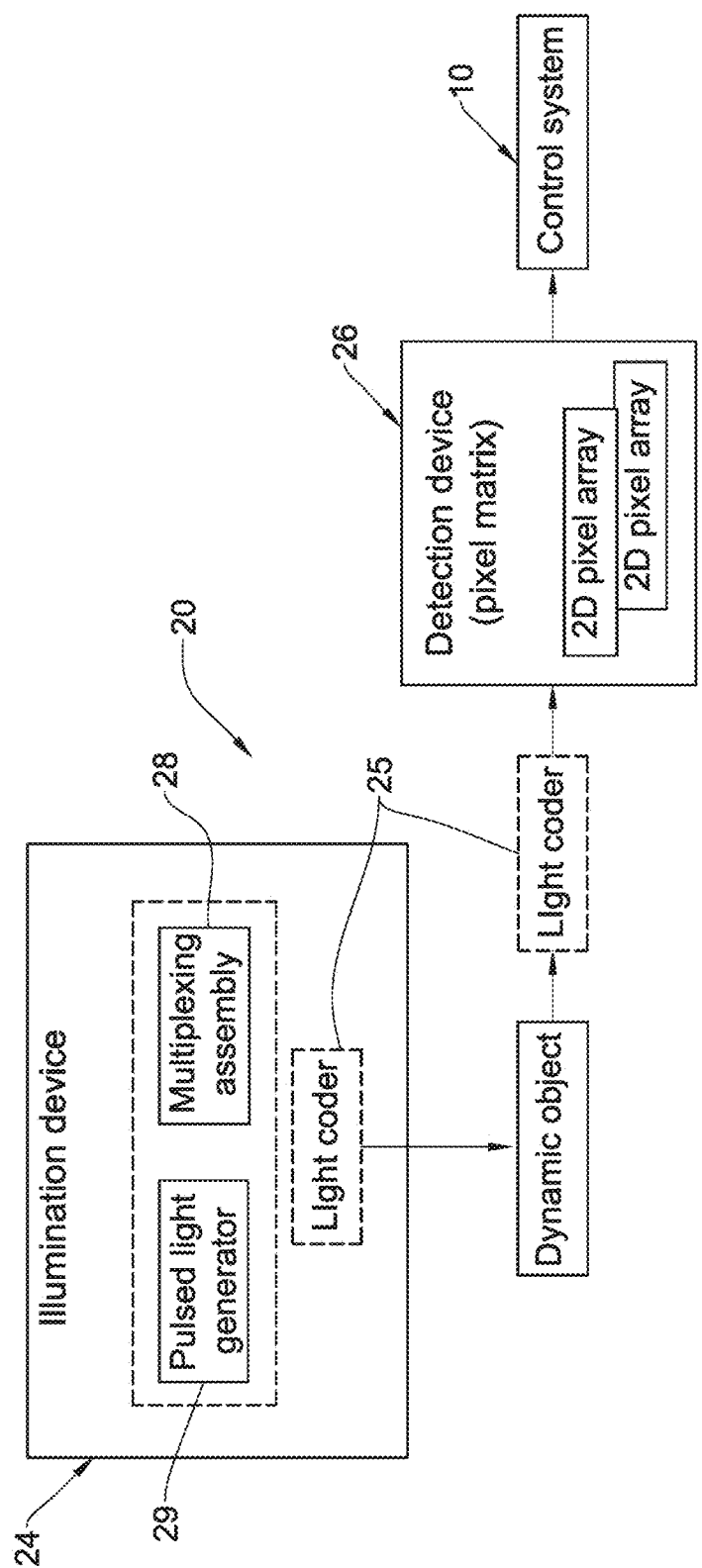
FIG. 2 is a block diagram of a single-exposure ptychography system of the present invention.

In this connection, reference is made to FIG. 2 schematically illustrating, by way of a block diagram, a ptychography system 20, configured according to the present invention. The system 20 includes an illumination device 24 and a detection device 26, which comprises a pixel matrix which, as will be described/exemplified below may be formed by a single 2D pixel array (e.g. CCD) or two or more such 2D arrays. As will be described below, the system 20 is configured and operable to enable object reconstruction from image data obtained in a single exposure session of the detection device, irrespective of whether the pixel matrix thereof is firmed by a single or multiple 2D pixel arrays. The system 20 is associated with/connectable to the control unit 10.

For the purposes of the SSP imaging, the optical system 20 includes a multiplexing assembly 28. According to some conventional configurations of the SSP embodiments, such multiplexing assembly 28 is located in an illumination channel of the optical system, or generally is a part of an illumination device, as exemplified, as an option, in FIG. 2; according to some other conventional configurations, a multiplexing assembly is a part of a collection channel. This will be described below with reference to FIGS. 3A and 3C.

As further shown in FIG. 2, the optical system 20 of the invention includes at least one light coding device 25, which is appropriately accommodated to apply at least one predetermined coding function to illuminating light and/or the light response of the object being collected. As a result, image data indicative of the detected light during a single exposure session is in the form of a coded light response of the object being illuminated.

As described above, in some embodiments of the invention, the system 20 is configured and operable to implement a combination of the concepts of SSP and TIMP techniques for use in reconstructing images of a dynamic object DO. It should be understood that reconstruction of a dynamic object actually includes reconstruction of a series of frames. As shown in FIG. 2 in dashed lines, in order to implement the TIMP technique in the system 20, the illumination device 24 includes a pulsed light generator 29, which is configured and operable to produce illumination in the form of a burst of pulses. In this connection, it should be understood, and is also exemplified below, the illumination device 24 may include a pulsed light source; or a CW light source and an appropriate switching device, such as an SLM. It should be noted that the pulse generator 29 may by itself represent a coder device 25, as illumination of the object by a burst of pulses applies to the illuminating light a predetermined time pattern, constituting a known coding function. As will be described further below, the pulses may be different from one another, e.g. in pulse shape and/or spectral characteristics and/or polarization and/or spatial profile.

The operation of the system 20, in its various implementations will be described further below. It should be understood, that the principles of the invention may be implemented in the system configuration for either one of transmission and reflection operational modes or emitted by the object (e.g. the object is a laser).

Figure 3A:
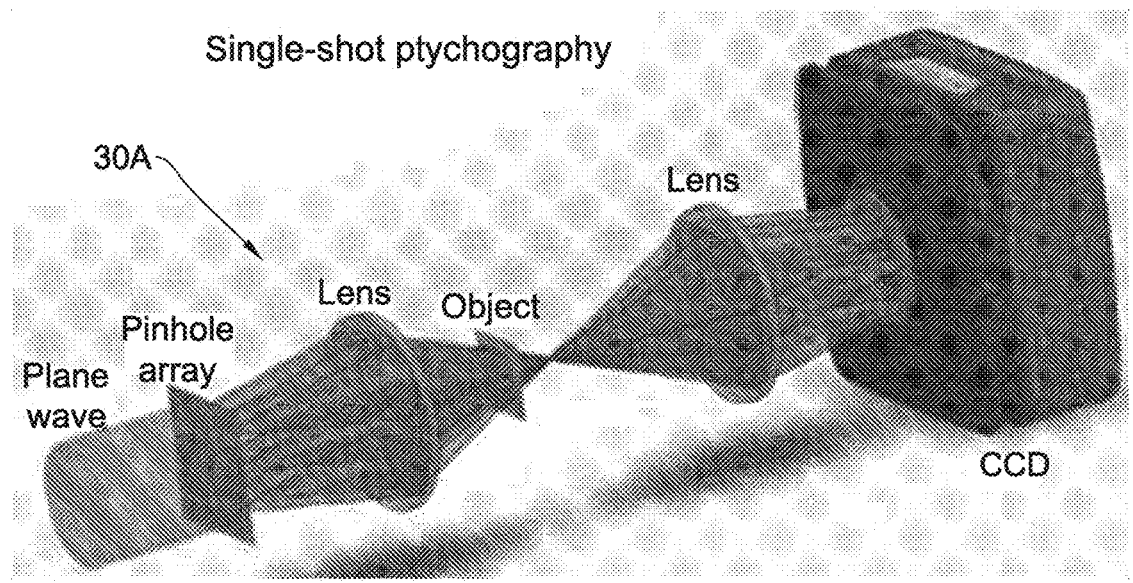
Figure 3B:
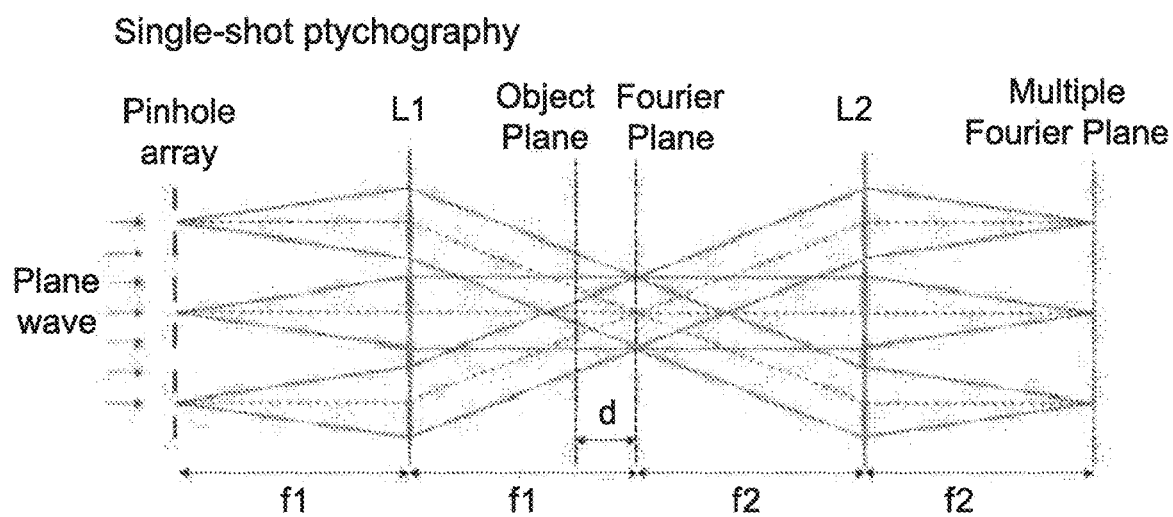

Reference is made to FIGS. 3A-3C showing schematically the configuration and operation of two examples of the known SSP arrangements (schmes) 30A and 30B (FIGS. 3A and 3C).

As shown in FIGS. 3A and 3B, in the known SSP system 30A configured according to earlier technique developed by the inventors of the present invention, and described in reference [6], a coherent monochromatic plane wave illuminates a square array of N×N pinholes (constituting a multiplexing assembly) that is located before or at the input face of an asymmetric 4f system (with lenses L1 and L2 with focal lengths f1 and f2, respectively), i.e. a so-called 4fSSP system. Lens L1, with focal distance f1, focuses the light beams that are diffracted from the pinholes onto the object, which is located at a distance d before the back focal plane of lens L1. Lens L2, with focal distance f2, focuses the diffracted light from the object onto the pixel matrix of a detector (e.g. CCD). Thus, in the system 30A, the object is illuminated simultaneously by multiple ($N^2$) partially-overlapping beams originating from the pinhole array that is located at the input plane of the 4fSSP optical system. The object is located at distance (d+f2) before lens L2, or at a distance (f2−d). Lens L2 transfers the field, diffracted by the object, to k-space domain at the CCD plane. Under appropriate conditions, the detected intensity pattern is formed by clearly distinguished $N^2$ blocks, where the pattern in each block results from a beam originating from a specific pinhole and illuminating the object at a certain region. Thus, the intensity distribution in each block is given approximately by:

$$I_m(v)=|F[P(r-R_m)O(r)]|^2 \qquad (1)$$

wherein v and r are the spatial vectors in the CCD and object planes, respectively; m=1, 2, 3 . . . N2 is the block/pinhole index; $N^2$ is the total number of blocks/pinholes; F stands for the two-dimensional spatial Fourier operator; O is the complex transmission function of the object; P is the complex envelop of the localized probe beam that illuminates the object (field originated from a single pinhole); and $R_m$ is the center of the illumination spot originated from a pinhole with index m.

As described above, beams from neighboring pinholes illuminate different but overlapping regions of the object. The overlap degree can be tuned by varying the distance d and/or the pitch of the pinhole array. Increasing the overlap between the beams from neighboring pinholes increases the redundancy, which in SSP is reflected by the fact that the number of measured pixels exceeds the number of pixels in the sought signal (somewhat similar to diffraction pattern oversampling in coherent diffraction imaging).

FIG. 3C shows system 30B of another known configuration of single-shot Fourier ptychography. Here, an object/sample is illuminated by a laser beam, and the exiting wave incident on the Dammann grating is diffracted into many replicas. Since the diffracted beams propagate in different angles, each of them experiences a corresponding lateral shift on the plane of the imaging lens and is differently filtered by the imaging lens when forming an image on the detector. Thus, the image array of the sample formed on the detector is essentially the same as the sum of the shifted version of sequentially recorded images in a common Fourier ptychography, and, accordingly, can be processed with a standard Fourier ptychography algorithm. Mathematically, the recorded intensity on the detector plane is:

$$I = \sum_{m,n}|F^{-1}[F[O(r-R_{m,n})]A(v-v_{m,n})]|^2, \qquad (2)$$

where O(r) represents the complex transfer function of the probe, F and $F^{-1}$ are the Fourier transform and its inverse, respectively, A (v) is the aperture function describing the cutoff frequency of the lens. $R_m$ represent the mn-th order diffraction in the spatial domain and $v_{m,n}$ represents the corresponding shift in the spectral domain.

Figure 4B:
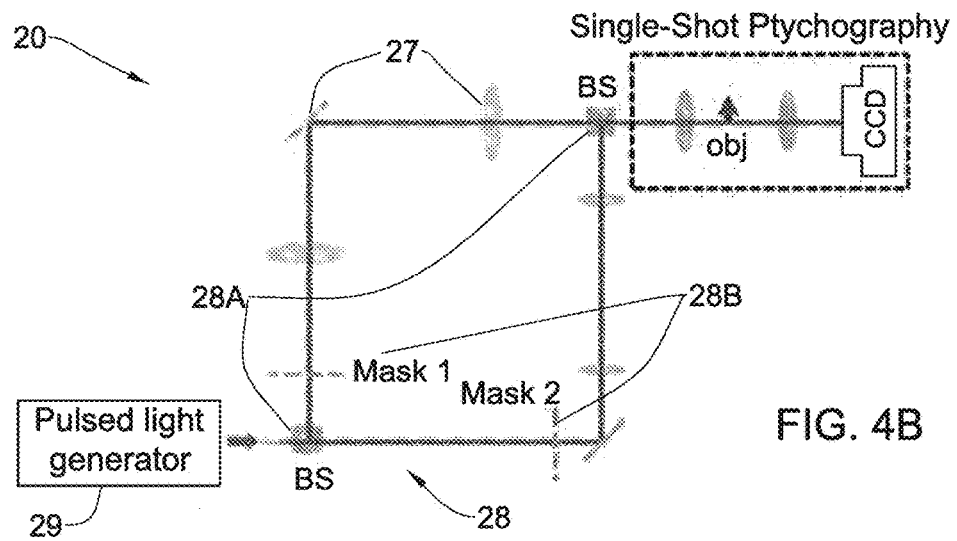

Turning now to FIGS. 4A and 4B, there are shown SSP systems 20 in accordance with two specific, but not limiting, examples of the present invention, which are configured to implement the TIMP technique of the invention for complex imaging and reconstruction of a "dynamic" object (fast occurring phenomena). In each of these examples, the system 20 is configured generally similar to the system 30A, namely it includes a multiplexing assembly 28 in an illumination channel (i.e. multiplexing the light at the object plane), and the 4F optical scheme of the SSP system. Also, in the example of FIG. 4A, the multiplexing assembly 28 includes a 2D pinhole array multiplexing the light at the object plane.

However, in the systems 20 of the present invention, the illumination device includes a pulse generator 29 constituting a light coder 25, such that the illumination is in the form of a burst of several ultrashort pulses, e.g. laser pulses, three such pulses $P_1$, $P_2$ and $P_3$ being shown in the example of FIG. 4A. As the pulses are ultrashort, it can be assumed that the object is static within the duration of each pulse, but as the object is dynamic, it may vary from pulse to pulse. An assumption is made that the diffraction patterns of light returned from the object illuminated by subsequent pulses do not overlap temporally on the pixel matrix (e.g. CCD). Also, the detector is operable with proper exposure time such that the pixel matrix (camera) integrates over time interval longer than the duration of the pulse burst.

In the example of FIG. 4B, the multiplexing assembly 28 includes a beam splitting/combining arrangement 28A including one or more beam splitters/combiners, where the beam splitter splits each pulse interacting therewith into two (or more) arms (light propagation channels), and includes a masking arrangement 28B including two or more masks having different spatial patterns in the two or more arms, respectively. Also, the optical system 20 includes light directing elements (e.g. reflectors, lenses), generally at 27. In the present, not limiting, example, a single beam splitter is shown splitting each pulse into two arms. In each arm, the pulse is transmitted through (or reflected from) a different mask (pinhole-array). All the masks are imaged into the input plan of the 4f single-shot ptychographic set up (which does not have a pinhole array in its input plane). Such system with two arms allows reconstruction of two frames from the single-exposure data.

It should be noted, although not specifically shown, that according to another example, of the TIMP based system, the illumination device includes a light source producing continuous wave (CW) light, and the pinhole array of the 4f single-shot ptychographic scheme is replaced by a spatial light modulator (SLM). In this approach, the SLM effectively produces the burst of pulses, with different spatial profiles, by simply altering its complex transmission function.

With the SSP system configuration according to the invention and proper exposure time of the camera, the pattern recorded by the single pixel matrix (camera) snapshot corresponds to the sum of the (diffraction) intensity patterns, where each intensity pattern originated/resulted from a different pulse. As will be described further below, multi-frame images, where each image corresponds to a temporal snapshot of the object illuminated by a different pulse, are reconstructed from the single recorded pattern.

As mentioned above, in some embodiments of the invention, the coding and multiplexing assemblies 25 and 28 may be formed by 2D array of fibers, or Micro Lens Array (MLA). Preferably, the pulses are different from one another in at least one of the following: pulse shape; spectral characteristics, polarization state, spatial profile.

Figure 4C:
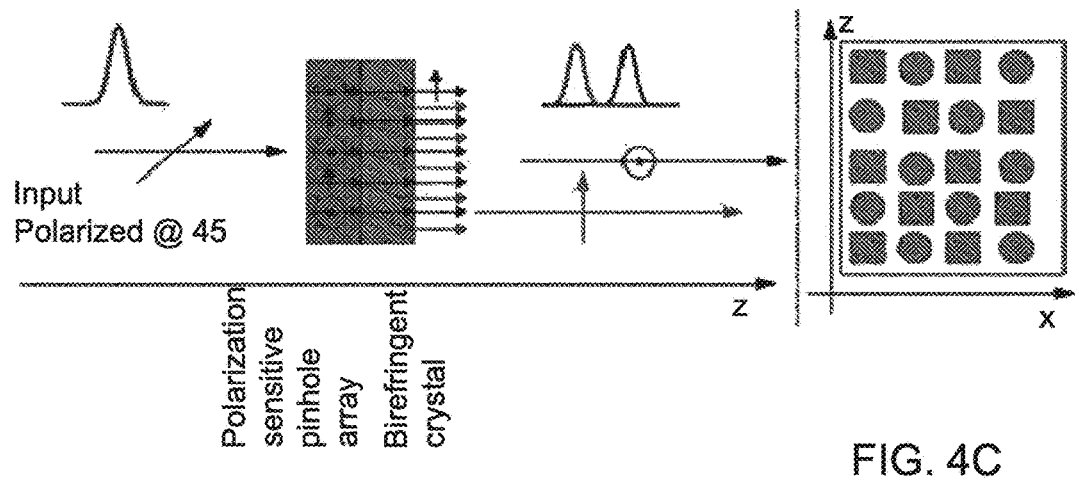
FIG. 4C exemplifies the system configuration allowing polarization-resolved TIMP.

FIG. 4C exemplifies an option of using birefringent medium (crystal) upstream of the pinhole array (with respect to general light propagation direction in the illumination channel). This enables to double the number of pulses and allow polarization-resolved TIMP. A pulse polarized at 45 degrees enters the 4f ptychographic optical set up (configured as described above). A polarization sensitive pinhole array encodes the pulse into two polarizations with different spatial profiles, and a birefringent crystal separates the two polarizations into two separate pulses, each with different polarization (due to different propagation velocities of the two polarizations within the birefringent crystal). The figure also shows a simplistic example for a polarization sensitive array, where the squares and circles are perpendicular polarizers. Thus, this configuration provides for multiplying the number of pulses in a compact manner, adding polarization sensitivity to the frames if needed.

Figure 5A:
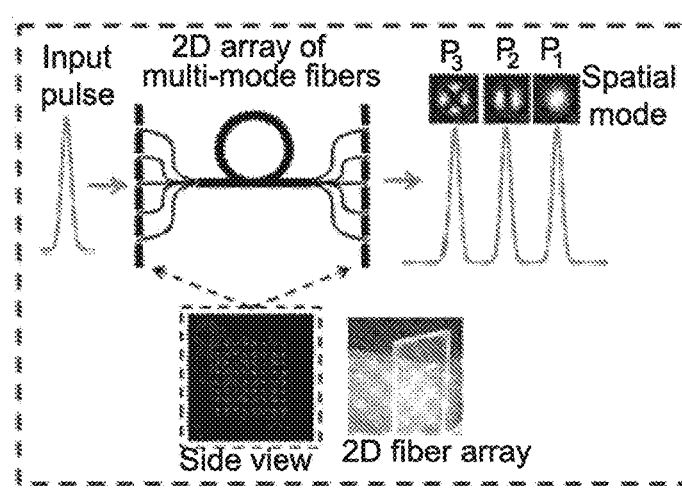
FIGS. 5A and 5B show two examples, respectively, of the configuration and operation of the fiber-based multiplexing assembly suitable to be used in the system of the present invention.
Figure 5B:
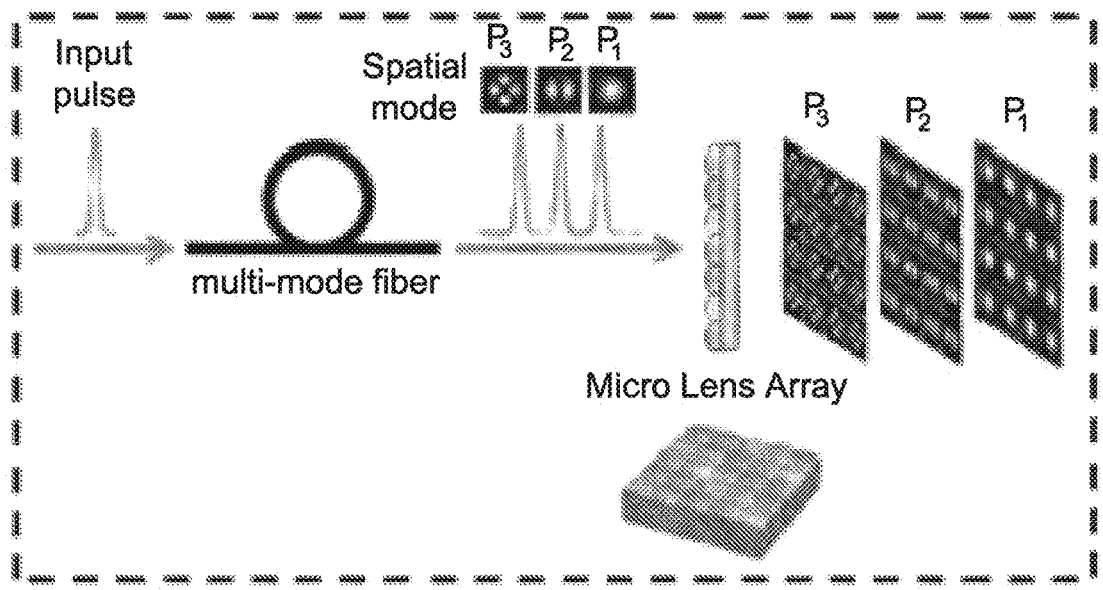

Reference is made to FIGS. 5A and 5B showing two examples, respectively, of the configuration and operation of the fiber-based multiplexing assembly 26.

In the example of FIG. 5A, the burst of pulses is produced using a 2D array of multi-mode fibers. Here, the 2D array replaces the pinhole array in the input plane of the single-shot ptychography system and functions as the required N×N source for the single-frame imaging. Due to modal dispersion in the multi-mode fibers, the different spatial modes are separated in time, resulting with burst of pulses exiting the 2D array while each pulse has a different spatial mode. The different spatial modes, which are orthogonal set of probes, enable the unique reconstruction of the complex-valued objects and exact ordering of the frames.

In the alternative example of FIG. 5B, the same is implemented using a single multi-mode fiber and a Micro Lens Array (MLA) Similarly, the modal dispersion in the multi-mode fiber causes the different spatial modes to be separated in time, resulting with a burst of pulses exiting the fiber with different spatial modes. Then, a 2D array of microlenses form a multiplexed image of the fiber's output as N×N sources for the single-shot ptycography system.

Thus, in the system of the present invention configured according to any of the above-described examples, as well as some examples described below, the intensity distribution measured by the pixel matrix (CCD) in each block is given by:

$$I_m(v) = \sum_{k=1}^{K} |F[P_k(r - R_m)O_k(r)]|^2 \quad (3)$$

wherein k is the pulse index in the burst.

The following is the description of a specific, but not limiting, example of a reconstruction algorithm suitable to be used in the present invention. More specifically, this is the Multi-state Ptychographic Algorithm (MsPA), developed in Ref [7], for reconstructing multiple frames $O_k(r)$ from measurements given by Eq. 2 above. The algorithm is based on iterative projections between two constraints set. First constraint is that each object $O_k(r)$ and each illumination function $P_k(r-R_m)$ remain the same for all exit-waves $\psi_{km}=P_k(r-R_m)O_k(r)$ at each illumination spot. Second constraint is in reciprocal-space, meaning that the estimated diffraction patterns has a modulus which corresponds to the square root of the measured diffraction patterns $I_m(v)$.

In each iteration of the MsPA, multiple exit-waves are simultaneously projected onto the measured intensity data to which they contributed during the data acquisition period. In this case, each exit-wave is associated with a different pulse at different illumination spot. The algorithm is initiated with an initial estimate of the objects and a known set of illumination functions for each pulse (i.e., $P_k(r)$ and $O_{i=0,k}(r)$). At each iteration the projections of the estimated exit-wave onto the constraint sets are accomplished in five steps for each illumination position m:

1) Form the exit-wave by $$\psi_{ikm} = P_k(r-R_m)O_{ik}(r) \quad (4)$$

2) Fourier transform of the exit-wave on the object plane $$\Psi_{ikm} = F[\psi_{ikm}] \quad (5)$$

3) The sum of the estimated exit-waves is updated with the intensities equals to the measured diffraction pattern whilst preserving their individual phase.

$$\hat{\Psi}_{ikm} = \frac{\sqrt{I_m}\,\Psi_{ikm}}{\sqrt{\sum_k |\Psi_{ikm}|^2}} \quad (6)$$

4) Inverse Fourier transform of the updated exit-wave is performed in order to obtain updated exit-waves $$\hat{\psi}_{ikm} = F^{-1}[\hat{\Psi}_{ikm}] \quad (7)$$

5) The estimates for next iteration are calculated by object-space updates that are applied simultaneously to all reconstructed frames and given by:

$$O_{i+1k}(r) = O_{ik}(r) + \alpha_O \frac{P_{km}^*(r)}{|P_{km}|_{max}^2}(\hat{\psi}_{ikm} - \psi_{ikm}) \quad (8a)$$

where $\alpha_O$ and is the update step size of the object function and * denotes the complex conjugate.

The MsPA algorithm can be further extended to reconstruct the probe function by simultaneously applying an update to the probe functions according to:

$$P_{i+1k}(r) = P_{i,k}(r) + \alpha_P \frac{O_{ikm}^*(r)}{|O_{ikm}|_{max}^2}(\hat{\psi}_{ikm} - \psi_{ikm}) \quad (8b)$$

where $\alpha_p$ is update step size of the probe function.

Each recovered object function represents a frame which corresponds to the time in which that probe pulse illuminated the object.

Figure 5C:
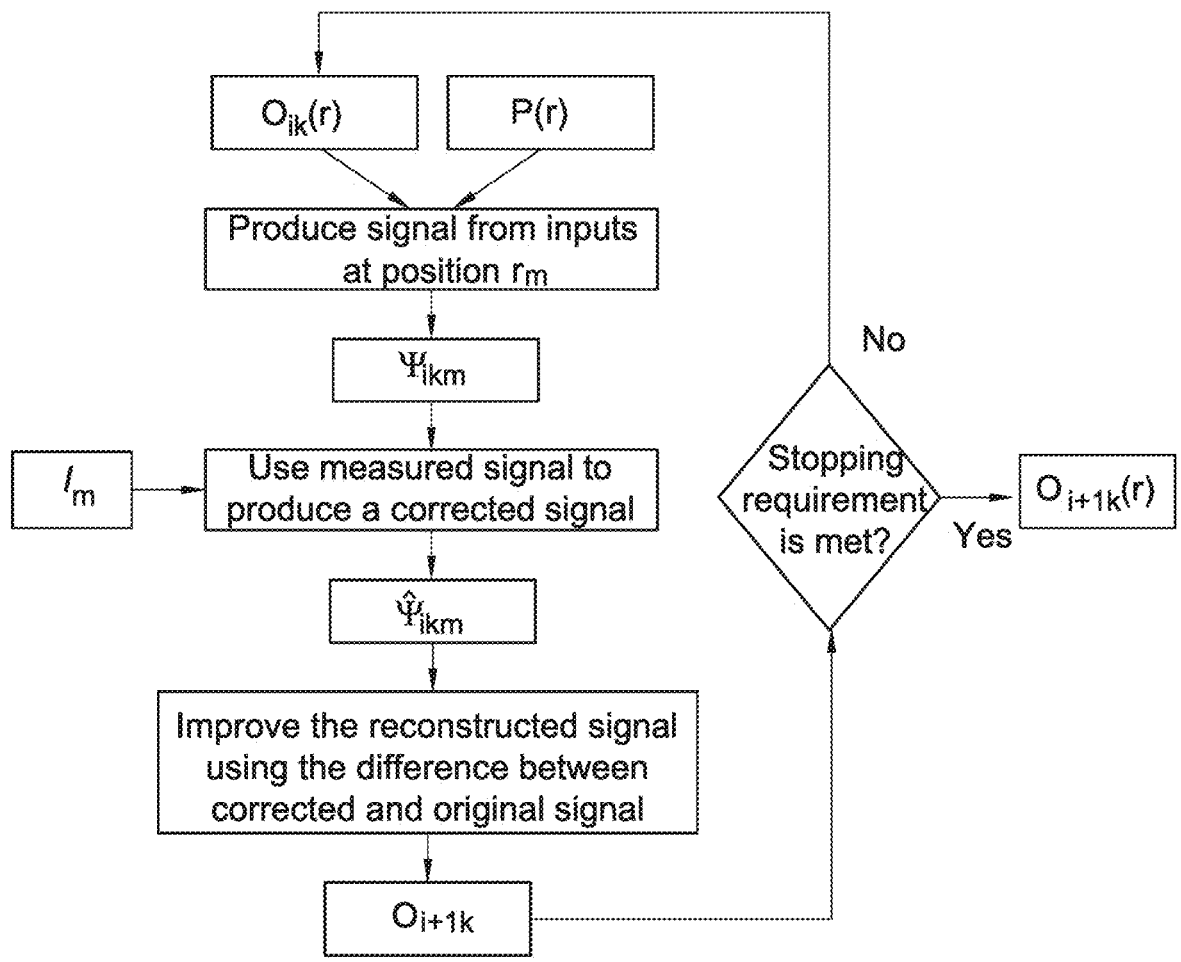
FIG. 5C shows a flow diagram exemplifying a Multi-state Ptychographic Algorithm (MsPA) utilizing the TIMP approach of the invention.

The above-described MsPA algorithm utilizing the TIMP approach of the invention can be visualized by flow diagram in FIG. 5C. The object and illumination function corresponding to each pulse, k, are updated at a position, m. All pulses are updated in parallel to satisfy Eq. (6). This operation is performed over the whole object by stepping through all positions, m, in a random fashion. When all positions have been updated the iteration number, i, is incremented. The whole procedure is then repeated until some stopping requirement is met—typically normalized RMS error metric between measured and calculated diffraction patterns.

In the experiments and simulations conducted by the inventors, for reconstructing multiple frames $O_k(r)$ from the single exposure session of the camera(s), the inventors have used the Multi-state Ptychographic Algorithm (MsPA) described in reference [7], which reference in incorporated herein by reference. It should, however, be understood that such algorithm is a non-limiting example (e.g. any phase-retrieval algorithm which uses iterative projections between two constraints set could be used). This algorithm was developed for recovering multiplexed information from highly redundant ptychographical data.

Thus, the present invention takes advantage of the general principles of the information multiplexing in SSP for a novel approach of the time-resolved multi-frame ultrafast imaging.

The following are some numerical examples of TIMP for phase only objects and complex-valued objects.

With regard to the phase only objects (or purely phase objects), it should be noted that additional prior information might be required in order to remove inherent, non-trivial ambiguities in the reconstruction of multiple objects $O_k(r)$ from a single measurement described by Eq. (3). One such prior information is that the imaged object is phase-only [8]. In this case, MsPA algorithm can successfully reconstruct several utterly different phase objects from a single camera snapshot of the SSP setup.

To demonstrate this numerically, the inventors have simulated a 4fSSP setup (system 20 of FIG. 4A) with the following parameters: N=6, $f_1$=75 mm, d=15 mm. While MsPA algorithm can, in principle, recover the illumination probes simultaneously with the objects reconstruction [7], in the simulation, inventors assumed known illumination (which can be measured or calculated before the imaging experiment).

The overlap between neighboring illuminations $P(r-R_m)$ and $P(r-R_{m+1})$ is ~85%. The simulation was repeated for different number of frames (also number of pulses) and Signal-to-Noise Ratio (SNR) values. In this connection, reference is made to FIGS. 6A-6C showing numerical demonstration of the TIMP technique with a burst of spatially identical pulses for imaging the dynamics of a phase-only object.

Figure 6A:
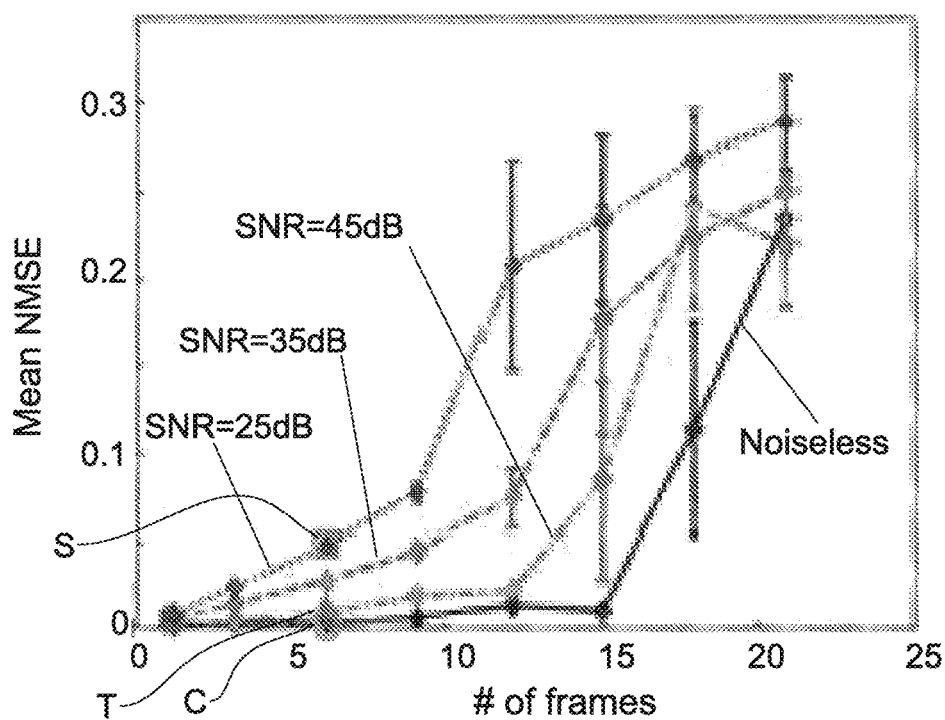
FIGS. 6A-6C show numerical demonstration of the TIMP technique of the invention with a burst of spatially identical pulses for imaging the dynamics of a phase-only object.

FIG. 6A shows mean Normalized Mean Square Error (NMSE) between the original and recovered frames as a function of the number of frames (also number of pulses) for different SNR values. It should be noted that in this example the correct order of the frames is assumed, but is not recovered algorithmically. The mean NMSE is calculated by arithmetic averaging over the individual frames NMSEs in the simulation. The error bars correspond to standard deviation. The black curve in FIG. 6A indicates that up to 15 frames can be correctly recovered from a single noiseless camera snapshot. While sharp transition in this curve (at the point of 15 frames) is clearly visible, the behavior of the other curves might be initially unexpected, but can be easily understood after recalling that noise is added to $I_m(v)$, which is the sum of diffraction intensity patterns. Consequently, the noise level per frame increases with the number of frames (it increases linearly if the total power is distributed equally between the frames), even though the noise level in each curve is constant. This explains the linear tendency of these curves in the range of small number of frames.

Figure 6B:
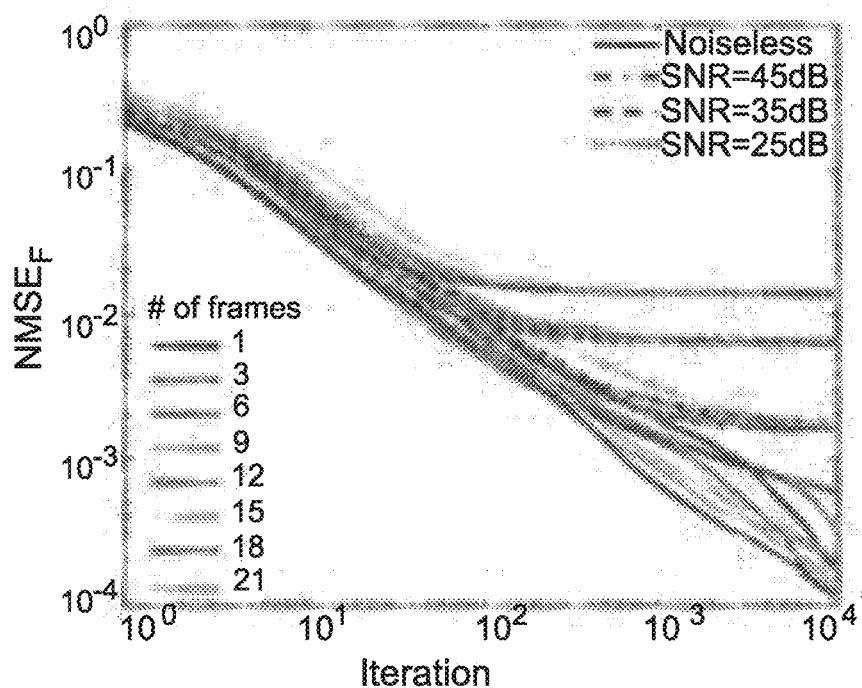

FIG. 6B shows NMSE between the diffraction patterns that were fed to the algorithm and the recovered diffraction patterns (named $NMSE_F$) at each iteration of the algorithm. In the figure, the number of frames is encoded by the line colors and the line dash types encode the SNR values. The algorithm stops after $10^4$ iterations or if it reaches $NMSE_F < 10^{-4}$. It is clear that the reconstruction algorithm stagnated for all the simulations with noise, which indicates stable convergence.

Figure 6C:
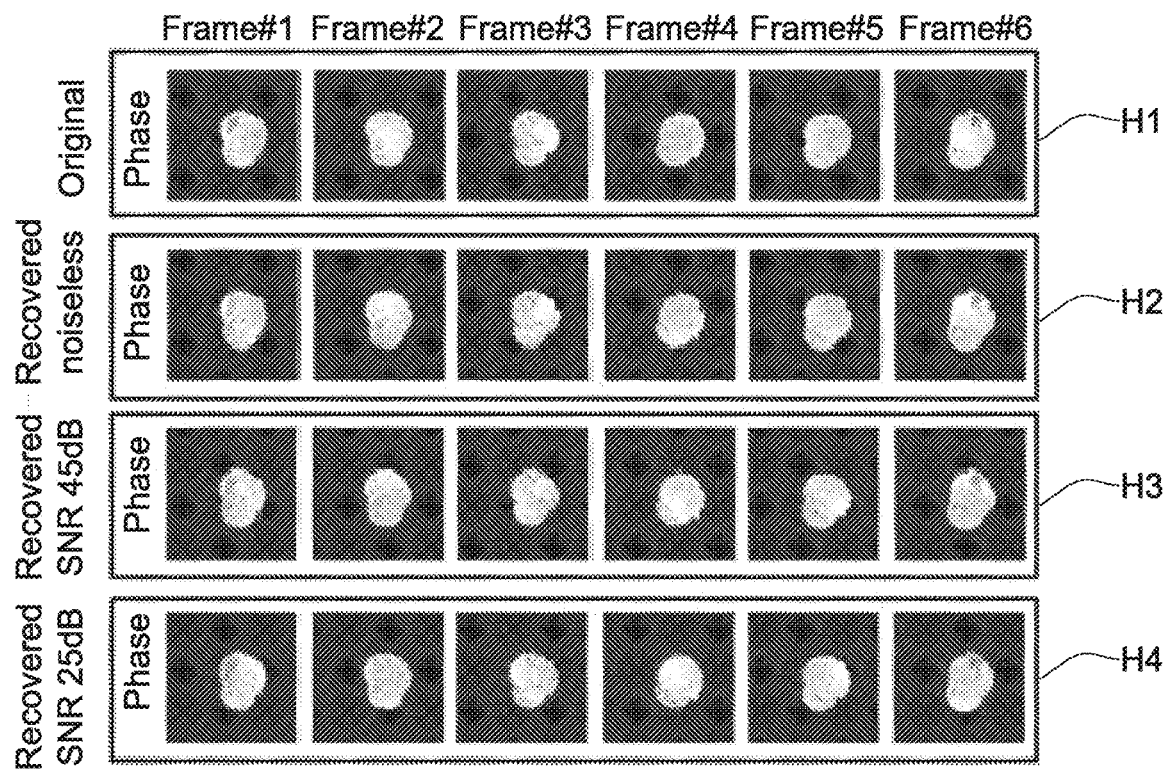

FIG. 6C shows exemplary reconstruction results: first horizontal panel H1 presents original set of 6 purely phase frames, second panel H2 presents noiseless reconstruction of the set of 6 frames (point marked circle C on the black curve in FIG. 6A), third and the bottom horizontal panels H3 and H4 show reconstruction of the frames from data with SNR=45 dB (point marked by triangle T on the purple curve in FIG. 6A) and from data with SNR=25 dB (point marked by square S on the blue curve in FIG. 6A), respectively.

For the complex-valued objects, such objects, generally, cannot be recovered uniquely from measurements described by Eq. (2) above. However, it was shown that orthogonal set of probes lead to the unique reconstruction of both the probes and the objects [8]. To utilize this property, the inventors consider another modification to the 4fSSP setup which allows reconstruction of general multiple complex-valued objects. More specifically, according to this modification, each pulse in the burst is different from the other pulses in a pulse shape and/or spectra and/or polarization state. In the simulation exemplified here, it was assumed that each pulse experiences an effectively different pinhole shape in the array. It should, however be understood that this embodiment of the invention of different pulses is not limited to the difference in the pulse shapes. This scenario can be obtained, for example, by using pulses with different spectra (or different polarization) and a pinhole array with a varying spectral (or polarization) response.

Thus, in this example, each pulse illuminates the object with a different (and measurable/known) spatial structure. In this case, the intensity diffraction pattern in block m is given by Eq. (3):

$$I_m(v) = \sum_{k=1}^{K} |F[P_k(r - R_m)O_k(r)]|^2 \quad (3)$$

Then, TIMP was simulated with the same parameters as described above (N=6, $f_1$=75 mm, d=15 mm), but assuming that each pulse in the burst experiences the same array but with different (known) pinhole shapes.

Figure 7A:
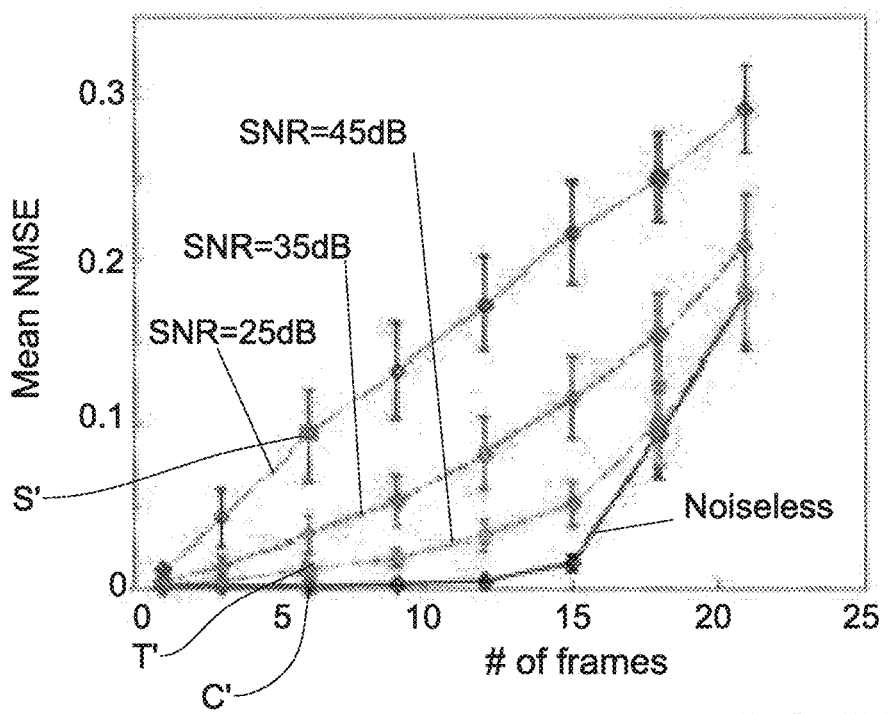
FIGS. 7A-7C present numerical example of the TIMP technique of the invention with a burst of pulses of different shapes for imaging the ultrafast dynamics of a complex-valued object.
Figure 7B:
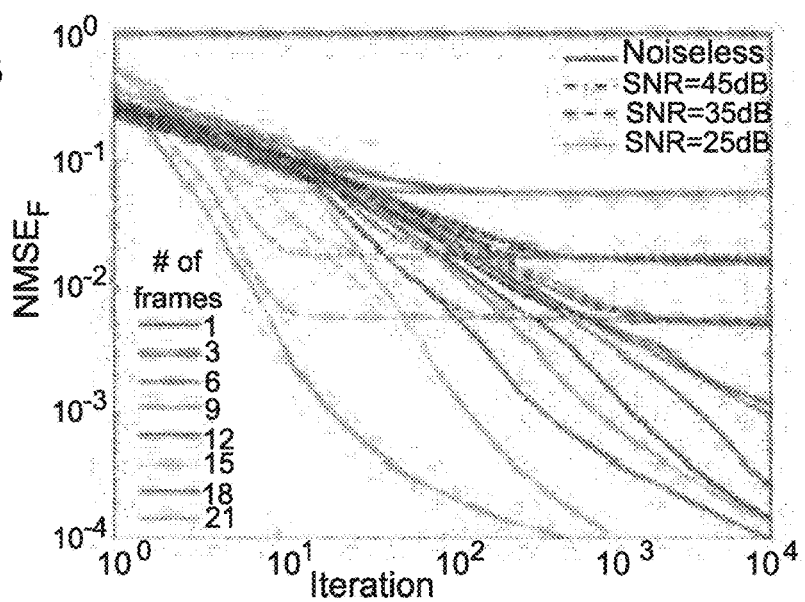
Figure 7C:
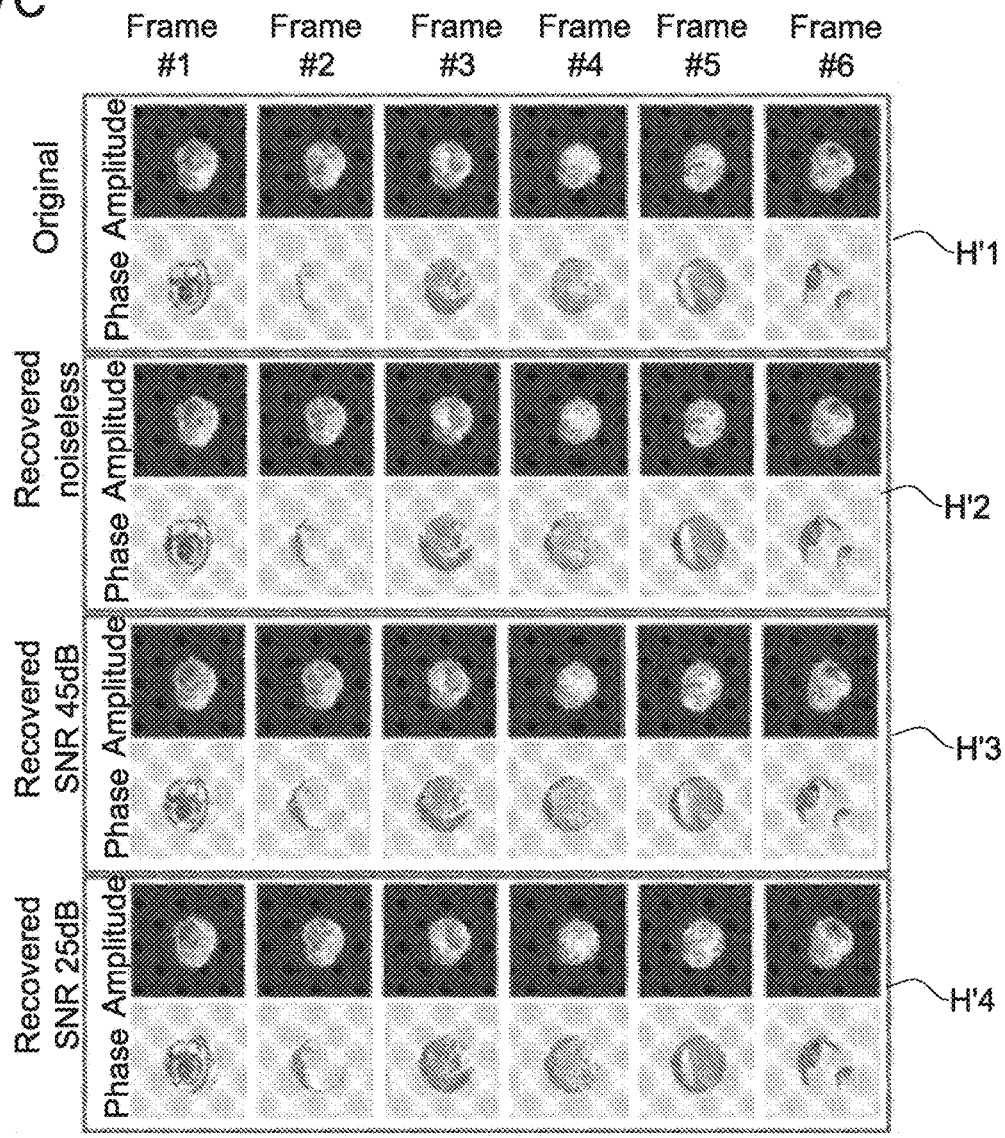

Reference is made to FIGS. 7A-7C, which exhibit the same structure as FIGS. 6A-6C, and present numerical example of TIMP for imaging the ultrafast dynamics of a complex-valued object.

FIG. 7A presents mean NMSE between the original and recovered complex frames as a function of the number of frames (also number of pulses) for different SNR values. It should be noted that, in contrast to the previous case, in this case the order of the frames is recovered algorithmically. The black curve in FIG. 7A indicates that up to 15 complex frames can be correctly recovered from a single noiseless camera snapshot. Curves that correspond to simulations with noise show the same linear tendency as in FIG. 6A (the origin of which is explained above).

FIG. 7B shows NMSE between diffraction patterns that were fed to the algorithm and the recovered diffraction patterns at each iteration of the algorithm (named $NMSE_F$), indicating stable convergence of complex-valued frames. A number of frames is encoded by the line colors, and SNR values encoded by the line dash types.

FIG. 7C shows the exemplary reconstruction results: first horizontal panel P'1 presents original set of 6 complex valued frames, second panel P'2 presents reconstruction of noiseless set of 6 frames (point marked by circle C' on the black curve in FIG. 7A), third and the bottom horizontal panels P'3 and P'4 show reconstruction of the frames from data with SNR=45 dB (point marked by green triangle T' on the purple curve in FIG. 7A) and SNR=25 dB (point marked by green square S' on the blue curve in FIG. 7A), respectively.

The following is the description of the experimental implementation of ultrafast ptychography using the TIMP technique of the invention, proving the feasibility of this technique. Here, single-pulse SSP is demonstrated experimentally.

In previous experiments conducted by the inventors [6], SSP was demonstrated with practically monochromatic continues wave illumination. In the present application, single-pulse SSP is exemplified proving that (spectrally wide) ultrashort laser pulse with limited flux (the flux is limited due to damage threshold of the samples) can be used in SSP.

In this connection, reference is made to FIGS. 8A-8G, where FIG. 8A shows a scheme of the setup; FIGS. 8B and 8C show measured diffraction patterns without and with the object respectively; FIGS. 8D and 8E display the reconstructed intensity and phase of the object, respectively, and FIGS. 8F and 8G show the reconstructed probe beam intensity and phase, respectively.

As shown schematically in FIG. 8A, a single pulse is picked from a pulse train produced by a laser source (Ti:Sapphire chirped pulse amplifier laser system), by an electro-optical modulator. The pulse width is ~150 ps, yet its spectrum, centered at 800 nm, can support 30 fsec pulse duration. The inventors used chirped pulse to avoid nonlinear effects associated with high peak power. A part of the pulse is converted to its second harmonic by a Beta Barium Borate (BBO) crystal. The inventors used second harmonic of 800 nm, because the optical setup was designed for 405 nm wavelength [6]). Then, the so-converted light interacts with a dichroic beam splitter, which separates the blue pulse from the leftover 800 nm pulse. The blue pulse is used to illuminate an array of 21 circular pinholes (the pinholes are placed on a square grid with 1.6 mm pitch) located at the input plane of a symmetric 4f lens system with f=75 mm.

The object (1951 USAF resolution target) is located at a distance d=15 mm before the Fourier plane of the 4f system. Lens L2 collects light diffracted by the object and captured by a pixel matrix (CCD camera) located at the output face of the 4f system.

FIG. 8B presents the square root of the intensity pattern captured by the camera without the object. This imaging without the object is used for calibrating the imaging system, i.e. for locating the centers of the blocks and for power normalization of each block [6]. The square root of the pattern measured with the object is presented in FIG. 8C, where 21 diffraction blocks are clearly distinguishable.

Then, the inventors applies the extended Ptychographical Iterative Engine (ePIE) reconstruction algorithm, and the results are shown in FIGS. 8D-8G. Here, FIGS. 8D and 8E display the reconstructed intensity and phase of the object, respectively, matching well to a known section in the 1951 USAF resolution target; and FIGS. 8F and 8G show the reconstructed probe beam intensity and phase, respectively, resembling a structure of diffraction from a circular pinhole. This experiment demonstrates the viability of the single-pulse SSP with illumination spectrum broad enough to support a femtosecond pulses.

FIGS. 9A and 9B show two examples, respectively, of novel single-exposure ptychography systems, generally designated 50A and 50B, configured without and with the TIMP feature, respectively. These systems 50A and 50B are configured for imaging objects that can be outside, possibly far away from, the imaging system. In this case, the scheme is based on splitting the incoming beam into two (or more) imaging arms, and is thus called BsSSP.

As shown in FIG. 9A, the incoming coherent beam, which is reflected from, transmitted through, or emitted by the object being imaged, is split into two (or more) arms of the BsSSP setup. In each arm, the incoming beam interacts with (e.g. passes through) a blocked Grating Array (GA) which leads to diffraction of the beam, and diffracted intensity patterns of different sections of the beam arrive to different zones in the imaging plane. The two arms include respective pixel matrix (cameras), Camera 1 and Camera 2, in the far field. Thus, in each arm, the CCD records a set of intensity patterns that originated from different (non-overlapping) sections of the beam that illuminated the GA. For obtaining the required overlap for ptychography, the GA in arm 2 is shifted with respect to the GA in arm 1.

The complete set of recorded patterns are used for ptychographic reconstruction of the complex beam, E(x,y), that illuminated the GAs. Back propagation of the recovered field obtains the complex valued image of the object to the object plane.

Mathematically, the transmission function of the GA is given by:

$$G_m(r) = \sum_{m=1}^{M} \hat{G}(r - R_m) \exp(ik_m r) \qquad (9)$$

wherein $\hat{G}(r-R_m)$ is a pupil function, which is identical for each grating in the array; $\exp(ik_m r)$ terms are linear phase factors that are different for each grating; and m= 1, 2, 3 ... M is the index of the grating in the array (M is the total number of gratings).

The diffracted intensity patterns are captured by cameras in the far field after free space propagation (assuming Fraunhofer approximation, or the use of a lens instead), and can be described as:

$$I(v) = \left| F\left[ P(r) \sum_{m=1}^{M} \hat{G}(r - R_m) \exp(ik_m r) \right] \right|^2 \qquad (10)$$

wherein v and r are the spatial vectors in the CCD and GA planes, respectively; F stands for the two-dimensional spatial Fourier operator; and P is the complex incoming beam at the GAs plane.

The different phase factors of the gratings in the array induce sufficiently different angle of propagation for each grating, resulting in block structure of the intensity pattern on the camera. Intensity pattern in each block corresponds to the magnitude of the Fourier transform of the nearfield after each grating (Fraunhofer approximation). Since the effect of the linear phase factors $\exp(ik_m r)$ is to shift the diffraction patterns laterally in the camera plane, the captured intensity pattern, Eq. (10), is formed by distinguished diffraction patterns that are located in M blocks.

Thus, Eq. (10) describing intensity patterns captured by the cameras can be rewritten as $$I_m(v) = |F[P(r)\hat{G}(r-R_m)]|^2 \qquad (11)$$

wherein $I_m(v)$ is the intensity pattern in each block.

Eq. (11) has a form of typical ptychographic measurements, but there is no overlap between adjacent pupil functions $\hat{G}$. To obtain the required overlap, the second arm of the camera has the same structure and is displaced transversally with respect to the first GA (FIG. 9A). In other words, partial overlap between the sections contributing to different diffraction patterns is obtained by introducing a transversal shift between the GAs. Now, the measurements in the two (or more) CCD's constitute a ptychographic set and standard algorithms [9, 10] can be used to recover the complex field at the GA. Finally, to get the complex image of the object, one needs to propagate the recovered complex field at the GA plane backward to the object plane.

FIG. 9B illustrates, in a self-explanatory manner a schematic diagram of the system of the invention utilizing principles of the above-described TIMP approach and based on the above-described BsSSP scheme.

It should be understood that the principles of the invention combining the SSP (either known SSP scheme of the novel scheme as exemplified in FIGS. 9A and 9B) and TIMP aspects (illumination pattern formed by a burst of pulses) can be added to commercial confocal microscopes by inserting a multiplexing assembly (e.g. a pinhole array) at the correct plane in the illumination channel. As in SSP, the frame rate of this scanning-less microscope would be determined by the detector. Using the TIMP with a proper train of pulses for the illumination, provides a significant increase of the frame rate, e.g. retrieving 10 frames for each camera snapshot. Also, SSP and TIMP can be implemented in every spectral region and for every type of waves for which focusing elements, lenses or zone-plates (in some spectral regions it can be useful to replace the 'Fourier transforming lens' by free propagation), and pulsed illumination are accessible.

It should also be noted that in some embodiments, as described above, different pulses do not temporally overlap on the detector, hence Multi-state Ptychographic Algorithm (MsPA) can be used for multi-framing. However, there might be the case that diffraction from trailing edges of pulses overlap with diffraction from the leading edges of their consecutive pulses, giving rise to an interference pattern in the recorded data. This extra information may be valuable. Also, the resolution of the recovered images can be further enhanced by utilizing structure-based prior knowledge on the object, thus providing ultrahigh-speed sub-wavelength imaging. The number of recoverable frames from each camera snapshot can be further increased by utilizing the fact that the differences between consecutive frames are most often small (sparse).

In the above-described examples of the system configuration the ptychographic data set is recorded in a single exposure, thus providing ultrafast ptychography. In these schemes, the CCD is divided into zones, and each zone recodes the diffraction pattern from a localized region in the object.

However, the partitioning of the CCD (hence also the division of the diffraction angle into cones) might result in deterioration of the resolution. For example, division of the CCD into N×N equal zones, limit the spatial resolution to Nλ/2. Moreover, measuring of an object with significant Fourier components beyond the spatial resolution component, results with "cross talks" between different zones on the CCD that eventually inhibit reconstruction.

The present invention solves this problem, by proving yet another system configuration for single-shot ptychography that enables a diffraction-limited microscopy, both in a single frame case and for filming ultrafast dynamics. More specifically, this novel system upgrades a conventional single-shot microscope into a phase and amplitude retrieval microscope, without spoiling its spatial resolution and field of view. Furthermore, it can also be used for ultrahigh-speed microscopy.

The system configuration is based on measuring the field (amplitude and phase) in the imaging plane of a conventional single-shot microscope by a single-shot ptychographic module (if required, one can then numerically propagate the measured field to the object plane through the known optical elements of the microscope.). Remarkably, following the magnification by the conventional microscope, the imaged object may not include high spatial frequencies, in which case the single-shot ptychographic module can be designed for paraxial waves without reducing the resolution.

Figure 10A:
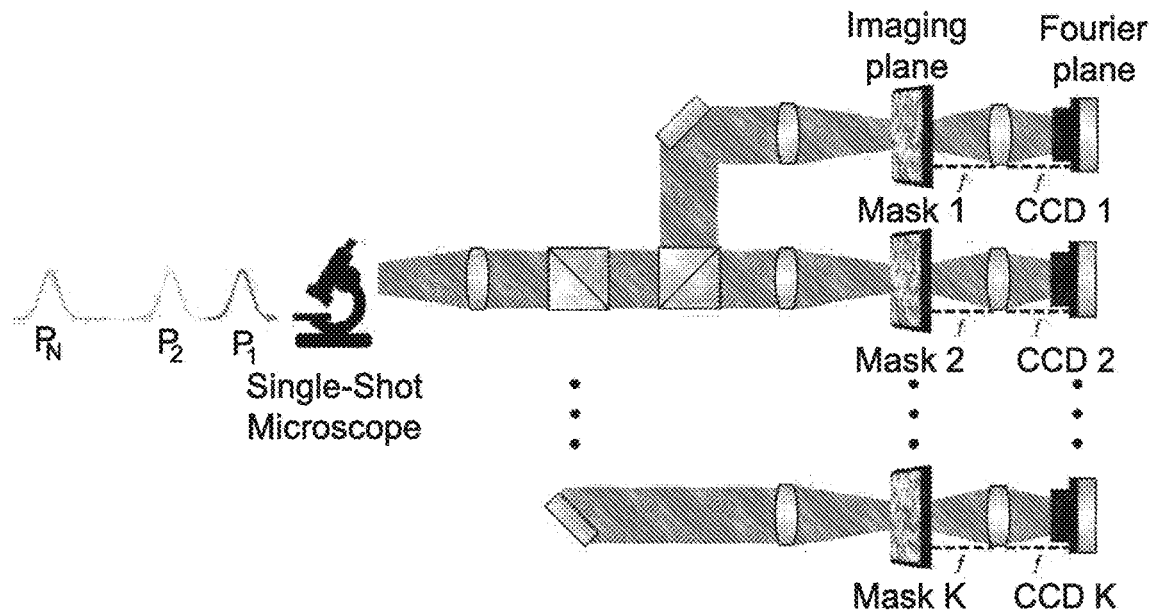
FIG. 10A schematically illustrates a high-resolution single-shot ptychography system according to another embodiment of the present invention based on beam splitting of light response from the object into K different arms, where in each arm, the beam (image) is convolved by a different mask, and each diffraction pattern is recorded in a different pixel matrix (e.g. CCD)

FIG. 10A schematically illustrates such a high-resolution single-shot ptychography system 40. In the system, the single-shot ptychographic module is based on the above-described beam splitting into K different arms, where in each arm, the beam (image) is convolved by a different mask, and each diffraction pattern is recorded in a different pixel matrix (e.g. CCD). Thus, the output of a high NA (diffraction limited) microscope is imaged into K different masks which lie on K different arms. The field is then multiplied by the mask and Fourier transformed through a lens into the CCD. Thus, each arm contains a mask, a CCD and Fourier transforming lenses. It should be noted that, by using proper masks, it is possible to record the same information as in the conventional scanning ptychography (e.g. by using aperture masks). Moreover, it is possible to use non-localized amplitude-only, phase-only or complex masks (phase-only masks are especially advantageous for weak signals). In this case, the recorded signal is given by:

$$I_m(v) = |F\{P_m(r)O(r)\}|^2, \qquad (12)$$

where $P_m(r)$ is the m-th mask, scaled according to the lens's focal distance and the illumination wavelength.

It should be understood that the above single-shot ptychographic system can be utilized for ultrahigh-speed imaging by using a burst of different pulses that illuminate the object at different times, and use multi-state reconstruction algorithm. For each pulse, the imaging system produces a diffraction pattern in each CCD. The CCDs are slow, hence they integrate over all these diffraction patterns and record the sum of them—the multiplexed diffraction pattern.

Thanks to the redundancy in ptychography, the recorded multiplexed pattern can determine all the frames. As described above, in order to arrange the frames in the correct order, each pulse in the burst is different from all the other pulses. For example, each pulse can be at a slightly different wavelength leading to an effectively different mask:

$$I_m(v) = \sum_{k=1}^{K} |S_k^{-1} F\{A_m \exp[iS_k^{-1} \varphi_m(S_k r)] O_k(S_k r)\}|^2; \qquad (13)$$

$$S_k = \frac{\lambda_k}{\lambda_0}$$

where $A_m$ is the m-th mask's amplitude, $\varphi_m$ is its phase for wavelength $\lambda_0$, and $S_k$ is the resulting scaling factor.

It should be noted that this method is scalable: in order to de-multiplex more and more frames without spoiling the resolution and field-of-view of the original conventional microscope, one can add more arms. Numerically, the inventors have shown that without noise, reconstruction of N complex-valued frames require 2N+1 arms with non-localized masks.

The reconstruction procedure is again based on the MsPA, where in this case it is assumed that the probe masks are known, and only the object is reconstructed. The algorithm is initiated with an initial estimate of the object function for each pulse (i.e. $O_{i=0,k}(r)$). Eq. (4) is modified to take into account the probe masks used:

$$\psi_{ikm} = S_k^{-1} A_m \exp[iS_k^{-1} \varphi_m(S_k r)] O_{ik}(S_k r); \qquad (14)$$

$$S_k = \frac{\lambda_k}{\lambda_0}$$

Eqs. (5-8a) are then applied, similarly to the previous case.

Figure 10B:
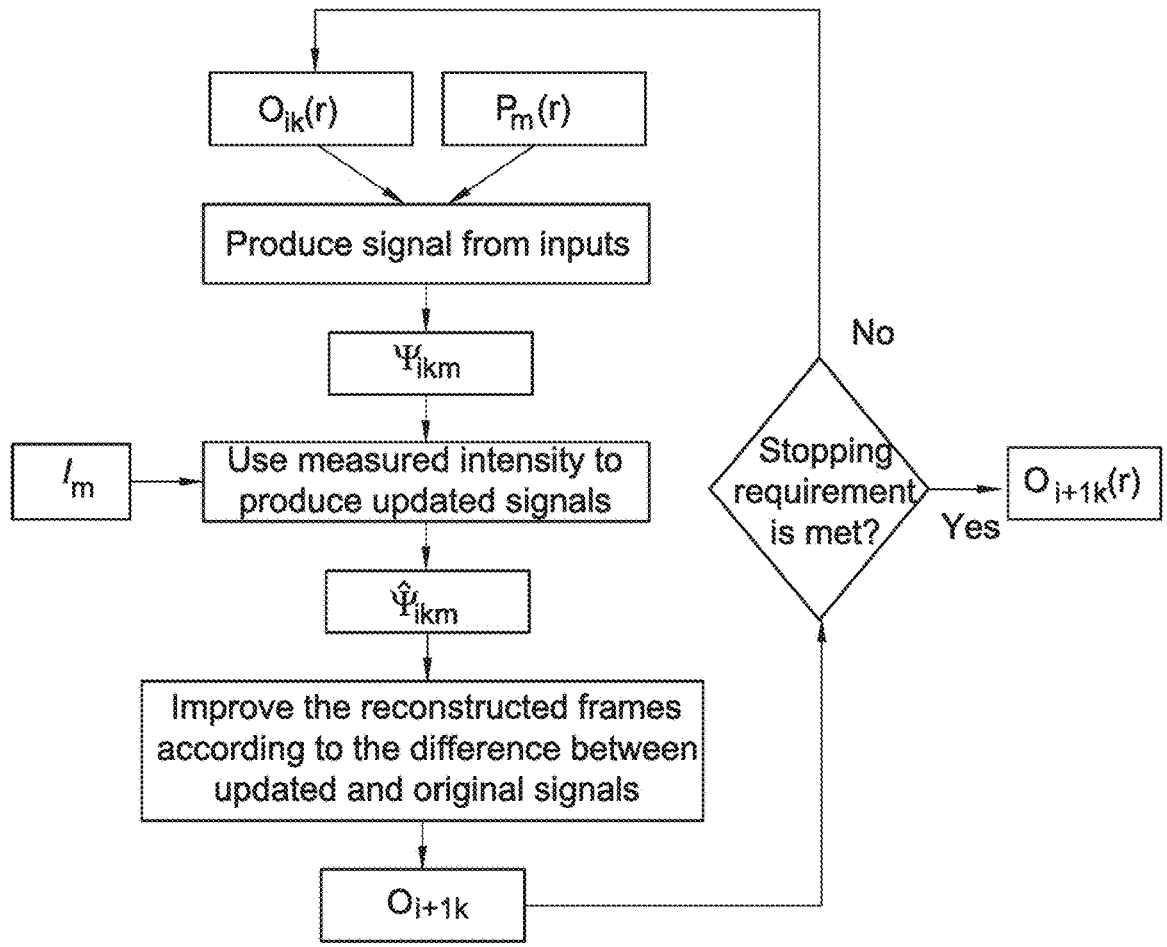
FIG. 10B shows a flow diagram exemplifying a Multi-state Ptychographic Algorithm (MsPA) utilizing the TIMP approach for multi-arm single shot ptychography system of the invention.

The above-described MsPA algorithm for multi-arm single shot ptychography can be visualized by a flow diagram in FIG. 10B.

As described above, according to one aspect of the invention, an illumination mode in the form of a known burst of pulses, preferably of different parameter(s), is used in a SSP-based system to enable image reconstruction of dynamic objects.

The present invention, in yet another aspect, provides for a novel approach for reconstructing multiple unknown pulses from a single multiplexed Frequency Resolved Optical Gating (FROG). Also, the present invention provides a novel technique combining the TIMP based SSP (or FSSP), as described and exemplified above, and multiplexed FROG to obtain complementary data about the dynamic object, as will be described further below.

FROG is a popular method for complete characterization of laser pulses, according to which a reconstruction algorithm retrieves the pulse from its measured auto-spectrogram (FROG trace). More specifically, a FROG apparatus produces a two-dimensional intensity diagram, also known as a FROG trace, by spectrally resolving the nonlinear interaction of the probed pulse with its delayed replica. In addition to the standard FROG, several FROG variants have been developed for different applications, for example Grating-eliminated no-nonsense observation of ultrafast incident laser light e-fields (GRENOUILLE) that can characterize ultrashort laser pulses in a single shot. In FROG and its variants, the pulses are reconstructed algorithmically from the measured FROG traces.

Until recently, all FROG techniques could characterize pulses only from their coherent pulses measurements. That is, it was critical that a FROG trace corresponds to a coherent interaction between the probed pulse and its delayed replica (FROG and GRENOUILLE), reference pulse (XFROG and FROG-CRAB) or another probed pulse (blind FROG).

The inventors have demonstrated, numerically and experimentally, multiplexed FROG in which several pulses of a pulse-burst are retrieved simultaneously from a single measured trace, which corresponds to the incoherent sum of the FROG traces of the individual pulses. Implementing multiplexed FROG enables characterizations of non-repetitive (non-identical) ultrashort isolated pulse-bursts (i.e. finite pulse train), that are currently not measurable. Indeed, current techniques cannot fully characterize the pulses in such bursts when the pulse repetition rate is in the range of 10 MHz to 1 THz. At a pulse rate less than 10 MHz, each pulse can be characterized independently of the other pulses by single-shot characterization devices (e.g. GRENOUILLE). The 10 MHz limit results from the frame-rate limitation of the detectors (e.g. the highest frame rate of Modern complementary metal-oxide-semiconductor (CMOS) detectors is $\sim 10^7$ frames per second). At pulse rate higher than THz, a complete burst with duration of several picoseconds, which includes several femtosecond pulses, can be characterized by single-shot characterization devices. Due to time-delay limitations of the single-shot characterization devices, bursts of femtosecond pulses with burst-duration larger than several picoseconds cannot be fully characterized. Thus, there is a significant and important range of pulse-rates for which pulses in a burst cannot be fully characterized.

The novel approach of the present invention provides for full characterization of pulses (that may be different) in repetitive or non-repetitive (e.g. isolated) pulse-bursts, including bursts with MHz-THz pulse repetition rate. Utilizing the redundancy in FROG, several pulses can be characterized from a single multiplexed FROG trace which corresponds to a sum of FROG traces, where each FROG trace corresponds to one of the pulses in the burst.

In the non-repetitive pulse bursts case, the multiplexed FROG trace can be recorded by a single-shot FROG (GRENOUILLE) that measures an isolated burst in a single detection snapshot. In the repetitive pulse-burst case, the multiplexed FROG trace can be measured by a scanning FROG device with short delay-scan, such that different pulses in the burst do not interact with each other in the nonlinear medium. The inventors have developed and explored a ptychographic-based algorithm for reconstruction of multiple pulses from a multiplexed FROG trace, and numerically demonstrated reconstructions of up to 5 pulses.

Figure 11A:
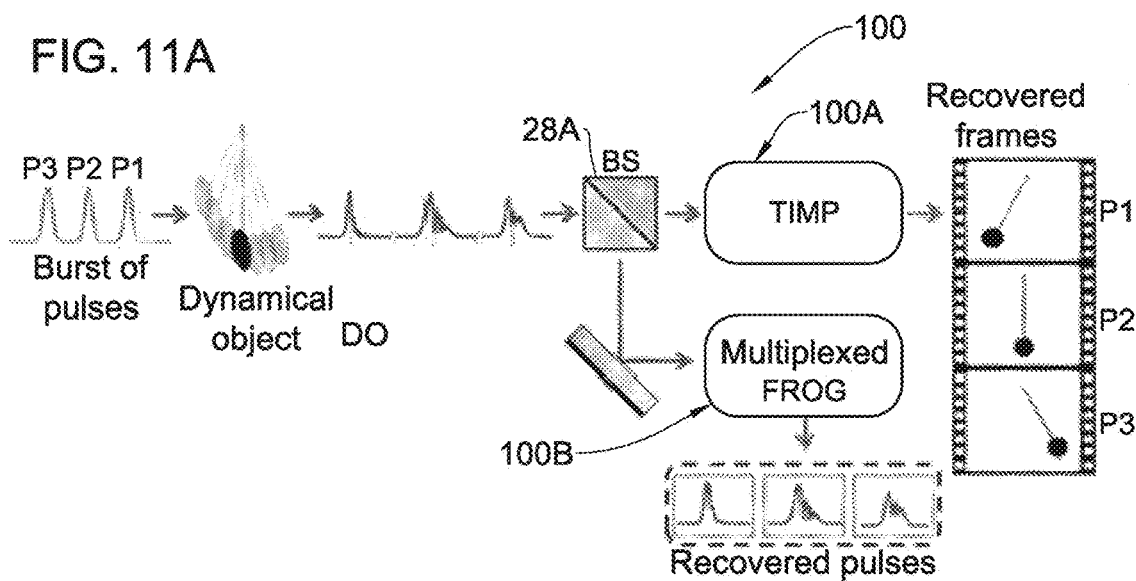
FIG. 11A is a schematic illustration of a combined system utilizing the principles of TIMP approach and multiplexed FROG approach in the SSP (or FSSP) system of the invention.

Reference is made to FIGS. 11A-11C and FIGS. 12A-12F. Here, FIG. 11A schematically illustrates a combined system 100 of the invention, combining the principles of the TIMP and multiplexed FROG in the single-exposure ptychography system to obtain complementary data about the dynamic object. In many applications, it would be useful to characterize the waveform of the femtosecond pulses in the burst (both amplitude and phase), simultaneously with their spatial characterization by an ultrahigh-speed imaging system. The combined measurement can yield ultrahigh speed imaging of the object, and simultaneously, the spatially averaged complex spectral transfer function (amplitude and phase), or equivalently the complex temporal response of the object, within each frame. As shown, in system 100, dynamic object DO is illuminated by a burst of pulses within the same exposure session of a detection device. The light response of the object, in the form of a series of diffraction patterns, interacts with a beam splitter 28A, which splits each pulse to propagate along two spatially separated arms. The SSP (or FSSP) optical unit 100A and multiplexed FROG unit 100B (the description of which is shown further below) are located in the first and second arms, respectively, and operate together to recover the pulses and a series of image frames from the dynamic object within the exposure session. The burst of pulses that probed a transient object is measured simultaneously by a TIMP microscope and by multiplexed FROG system.

Figure 11B:
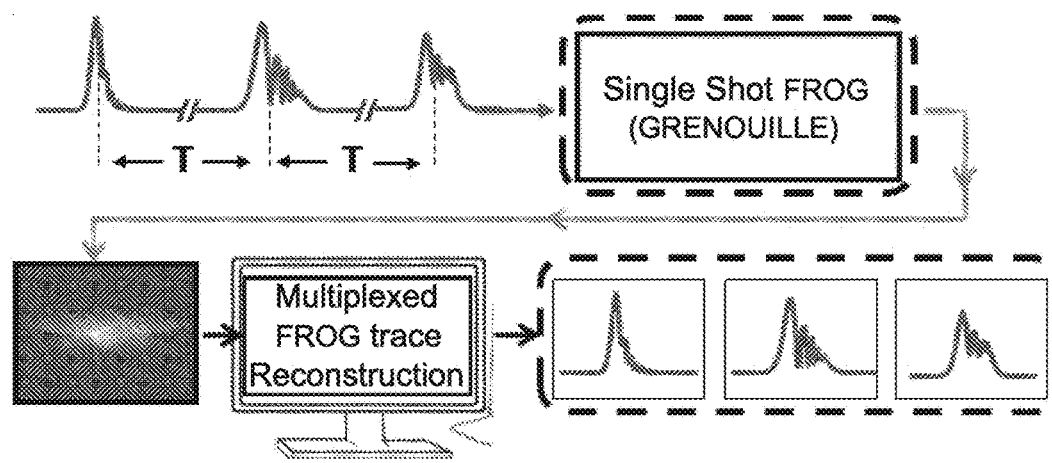
FIG. 11B schematically illustrates a system setup for completely characterizing the pulses in an isolated burst
Figure 11C:
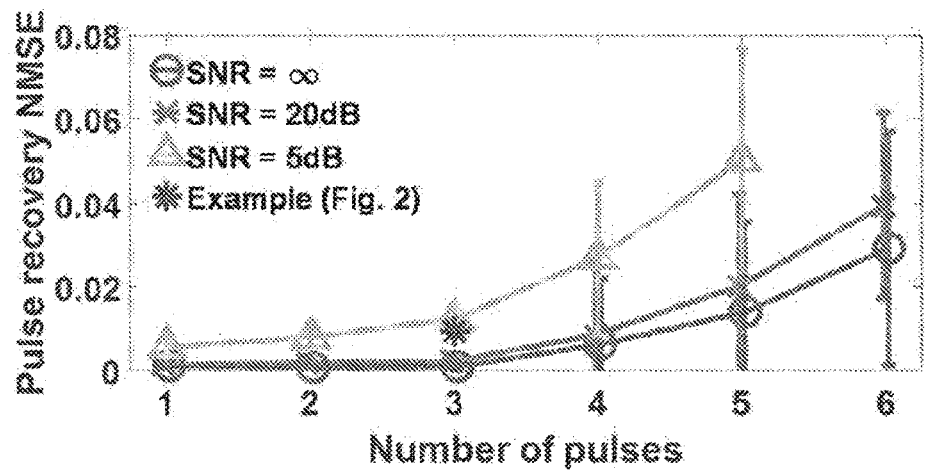
Figures 12A, 12B, 12C, 12D, 12E, 12F:
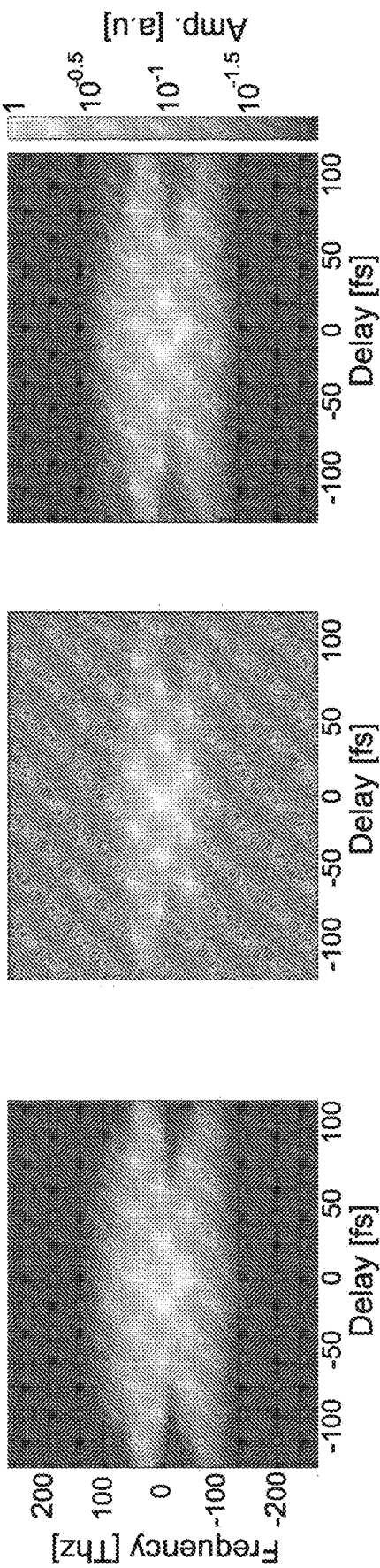

FIG. 11B schematically illustrates a system setup 50 for completely characterizing the pulses in an isolated burst. The burst is measured by a single-shot FROG which records a single multiplexed FROG trace. The multiple pulses are then reconstructed from the single multiplexed FROG trace. FIG. 11C shows average Root Mean Square Error (RMSE) as a function of number of pulses for different noise levels. FIGS. 12A-12F show the results of recovery in a numerical example of characterizing 3 pulses from a single multiplexed FROG trace (which corresponds to the sum of the 3 FROG traces that are associated with the 3 pulses). Here, FIGS. 12A-12C show, respectively, the multiplexed FROG trace, the multiplexed trace with white Gaussian noise of 5 dB SNR, and reconstructed multiplexed trace; and FIGS. 12D-12F show original and reconstructed intensities and phases of the three pulses.

The inventors employed the ptychographic FROG reconstruction approach for inversion of the multiplexed FROG trace. The inventors took advantage of the technique recently developed by the inventors for ptychographic-based algorithm for 'ordinary' (single pulse) FROG trace inversion demonstrating superior performances, e.g. super-resolution, by utilizing the inherent redundancy in FROG traces [11], and modified the Multistate Ptychographic Algorithm (MsPA) for FROG, and employed the information multiplexing in a single FROG trace for recovery of multiple pulses from a single multiplexed FROG trace. The numerical simulations demonstrate that if additional information about the pulses is known in advance, e.g. their power spectra, then successful recovery of up to 5 different pulses is possible from a single noisy multiplexed FROG trace.

For the numerical simulations, the inventors numerically produced a set of 100 laser pulses that conform to a Gaussian power spectrum that is centered at 800 nm and its spectral bandwidth is 50 nm. Each pulse is produced by applying a random spectral chirp to the above power spectrum (the FWHM of the pulse is ≤38 fs). Then, 6 sets of 50 multiplexed FROG traces were generated that correspond to pulse-bursts with 1-6 pulses. White-Gaussian noise was added to the simulated multiplexed FROG traces, at different SNR values.

Then, the pulses were recovered from the noisy multiplexed traces, assuming that the power spectrum of the pulses is known. After removing trivial ambiguities (time shift, time direction, mirror reflection and global phase) from the reconstructed pulses, the error of the reconstructions was evaluated using Normalized Mean Square Error (NMSE) between original and reconstructed pulses, respectively.

FIG. 11C shows the mean NMSE (mean over 50 realizations of multiplexed FROG trace) between the recovered and original pulses as a function of number of pulses used to generate the multiplexed trace. Clearly, the ptychographic-based reconstruction algorithm recovers up to 4 pulses from a single multiplexed trace for all explored SNR values.

FIGS. 12A-12F present typical results for reconstruction of 3 pulses from a single noisy multiplexed FROG trace. A multiplexed trace (from the set prepared for the analysis of FIG. 12B) is shown in FIG. 12A. White Gaussian noise at 5 dB SNR is added to the multiplexed trace (FIG. 12B) and this data is fed to the algorithm. FIG. 12C shows the trace recovered by the algorithm while 3 individual original and recovered pulses are compared in FIGS. 12D-12F. The NMSEs between original and recovered pulses are 0.004, 0.0165 and 0.0074 for this particular example. FIGS. 12D-12F also show the FROG trace of each pulse. The multiplexed trace corresponds to the sum of these 3 traces.

Hence, the inventors have demonstrated numerically an approach for full characterization of pulses (that may be different) for both repetitive and non-repetitive (e.g. isolated) pulse-bursts, including bursts with MHz-THz pulse repetition rate. To this end, a ptychographic-based algorithm was used for reconstruction of multiple pulses from a single multiplexed FROG trace, demonstrating numerically robust reconstructions of up to 5 pulses.

The following is more specific description/definition of the multiplexed FROG trace and the reconstruction procedure.

For simplicity, multiplexed FROG is presented here using second harmonic generation (SHG). Let us assume a burst of N different pulses, where the complex envelope of the n-th pulse in the train is given by $E^{(n)}(t)$. The N-multiplexed FROG trace of this burst is given by:

$$I_{M-FROG}^N(\omega, \tau) = \sum_{n=1}^{N} \left| \int E^{(n)}(t) E^{(n)}(t-\tau) e^{i\omega t} dt \right|^2 \quad (15)$$

wherein $\tau$ is the delay between the pulse and its replica.

Figures 13A, 13B, 13C:
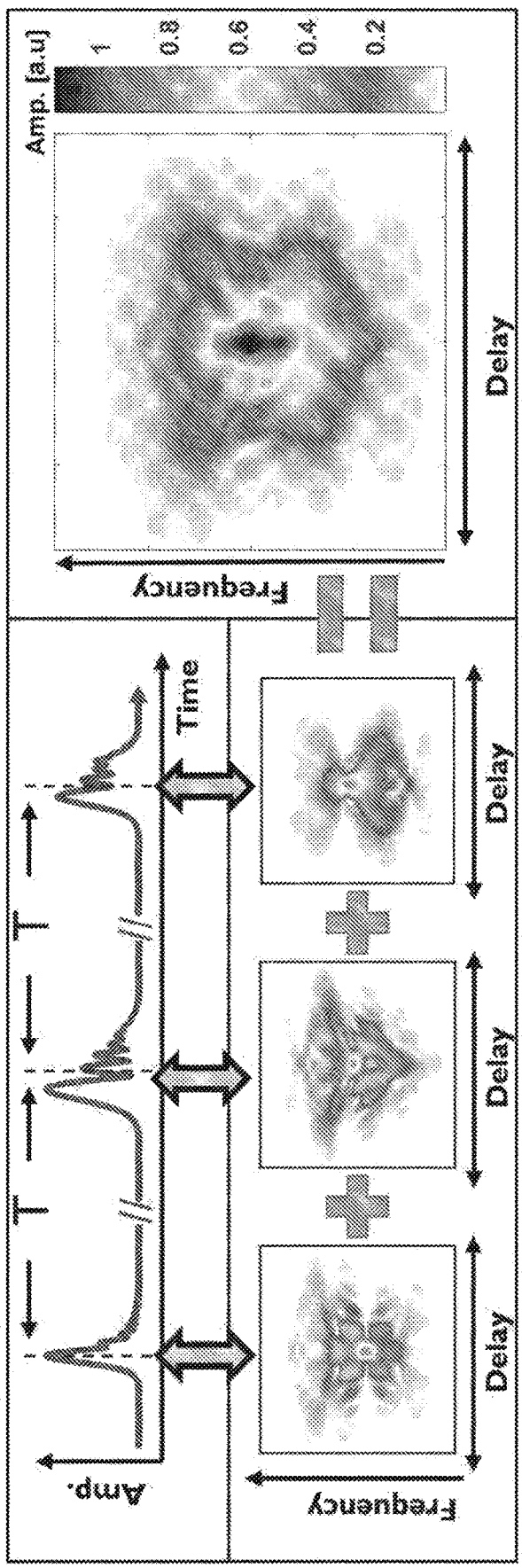
FIGS. 13A-13C illustrate the principle of the multiplexed FROG trace, where

It should be noted that a multiplexed FROG trace with N=1 corresponds to an ordinary FROG trace. FIGS. 13A-13C illustrate the principle of the multiplexed FROG trace, where FIG. 13A shows a burst of three pulses, with the duration of each pulse being much smaller (shorter) than the time interval between them, FIG. 13B shows SHG-FROG traces which are generated from each pulse separately; and FIG. 13C shows a multiplexed FROG trace, that corresponds to the sum of the three individual traces depicted in FIG. 13B.

In multiplexed FROG, the pulses in the burst are reconstructed from the single measured multiplexed FROG trace. Since the multiplexed FROG trace does not include data about the time intervals between the pulses or their order, these quantities remain unknown. In a standard scanning FROG device, a multiplexed FROG trace can be measured by setting the delay range such that each pulse interacts only with its replica (as will be described below). As described above, using GRENOUILLE, multiplexed FROG traces are obtained when the device's delay-range is smaller than the interval between pulses in the burst, enabling reconstruction of non-repeating pulse bursts which were so far not measurable. Also, the spectral resolution of the measurements, $\Delta\omega$, should be larger than one over the inter-pulse interval, hence interference fringes between two pulses' signals are indiscernible.

The recovery algorithm used by the inventors is based on the ptychographic reconstruction algorithm for FROG (without soft thresholding), which in turn relies on the extended ptychographic iterative engine (ePIE). The inventors modified this technique for multiplexed FROG.

A convenient discrete form of Eq. (15) above is:

$$I_j^N(\omega) = \sum_{n=1}^{N} |F(\chi_j^{(n)}(t))|^2, \quad (16)$$

wherein $\chi_j^{(n)}(t) = E^{(n)}(t) E^{(n)}(t-j\Delta\tau)$ is the SHG signal produced at a delay given by $j\Delta\tau$, $j=1, \ldots, J$ is a running step delay index, $\Delta\tau$ is the delay step, and F stands for the Fourier transform operator.

The iterative recovery algorithm starts with an initial guess for the set of the N unknown pulses, where N is assumed to be known (the case where N is unknown a priori will be described below). The initial pulses have a Gaussian spectrum with a random, smooth spectral phase. Each iteration of the recovery algorithm starts with producing a new array of the integers $j=1, \ldots, J$, yet in a random order, $s(j)$. This array is used for randomizing the order in which the step delays are updated within one iteration of the algorithm. Therefore, within each iteration, the recovered pulse is modified J times in random order using an internal loop (with running index j).

The following is the description of the sequence of steps to obtain the j-th modification within the internal loop, i.e., the steps to yield the updated recovered fields $E_{j+1}^{(n)}(t)$ from the fields $E_j^{(n)}(t)$ and the measured spectrum at time delays $s(j)$, $I_{s(j)}^N(\omega)$.

First, the SHG signals of the fields from the previous iteration are calculated:

$$\psi_j^{(n)}(t) = E_j^{(n)}(t) E_j^{(n)}(t-s(j)\Delta\tau). \quad (17)$$

Second, the SHG signals are Fourier transformed, and their moduli are replaced by the square root of the $s(j)$-ordered measured spectrum, divided by their sum:

$$\Phi_j^{(n)}(\omega) = \sqrt{I_{s(j)}^N} \frac{F[\psi_j^{(n)}(t)]}{\sum_n |F[\psi_j^{(n)}(t)]|^2}. \quad (18)$$

Third, the updated SHG signals are calculated by inverse Fourier transforming to the temporal domain, $$\tilde{\psi}_j^{(n)}(t) = F^{-1}[\Phi_j^{(n)}(\omega)]. \quad (19)$$

Finally, the pulses are updated according to the difference between the signal calculated from Eq. (14) and the corrected signal produced from Eqs. (18-19) with a weight function based on the complex conjugates of $E_j^{(n)}(t)$ divided by its maximal intensity.

$$E_{j+1}^{(n)}(t) = E_j^{(n)}(t) + \alpha \frac{E_j^{(n)*}(t-s(j)\Delta\tau)}{|E_j^{(n)}(t-s(j)\Delta\tau)|_{max}^2} (\tilde{\psi}_j^{(n)}(t) - \psi_j^{(n)}(t)). \quad (20)$$

In Eq. (20), $\alpha$ is a real parameter that controls the strength of the update. Crucially, in this algorithm a new $\alpha$ is selected randomly in each iteration (the inventors have found a uniform probability in distribution in the range [0.1, 0.5]).

Unless other constraints are available, Eq. (20) is the final step in each iteration of the internal loop. Often, however, the power spectra of the pulses can be measured quite accurately. The spectra can be useful for improving the performances of the reconstruction algorithm. In this case, these measurements are imposed on the fields obtained in Eq. (20) by replacing their calculated spectral amplitudes with the root of the measured power spectra $-\hat{S}_j^{(n)}$ $$\hat{E}_{j+1}^{(n)}(\omega) = \sqrt{\hat{S}_j^{(n)}} \frac{F[E_{j+1}^{(n)}(t)]}{|F[E_{j+1}^{(n)}(t)]|}. \quad (21)$$

Finally, by projecting the result of Eq. (21) back to temporal domain, the output of the iteration can be obtained through inverse Fourier transforming it:

$$\hat{E}_{j+1}^{(n)}(t) = F^{-1}[\hat{E}_{j+1}^{(n)}(\omega)]. \quad (22)$$

Iterations continue until the stopping criteria (the difference between the measured and calculated FROG traces is smaller than the SNR) is met or until the predefined maximal number of iterations is reached.

The inventors explored the performance of multiplexed FROG numerically. To this end, a set of 100 laser pulses was numerically produced where all the pulses conform to a Gaussian power spectrum that is centered at 800 nm and its spectral bandwidth is 50 nm. Each pulse (N=256 grid points) is produced by applying a random spectral chirp to the above power spectrum, conditioned that the FWHM of the pulse is smaller than 38 fs (~4 times the transform limited FWHM).

The calculated FROG traces for each pulse are 256 by 256 points with equally spaced delays, $\Delta t=2.63$ fs, and spanning the same frequency window (i.e., the product of the delay and spectral resolutions is $1/N=1/256$). Then, 6 sets of 50 multiplexed FROG traces were generated that correspond to pulse-bursts with 1-6 pulses. White-Gaussian noise $\sigma$ is added to the simulated multiplexed FROG traces, at different SNR values, defined by SNR=20 log $(\|I_{FROG}\|/\|\sigma\|$, where $\|\cdot\|$ stands for $\ell_2$ norm.

The pulses where recovered from the noisy multiplexed traces using the reconstruction algorithm. To characterize the quality of the reconstructions, let us consider that SHG FROG suffers from the following trivial ambiguities: trivial time shift, time reversal with phase conjugation direction, and global phase.

Thus, the above first two ambiguities were removed from the reconstructed fields by minimizing the difference between the original and reconstructed pulses under translation and conjugate reflection transformations. Then, the error of the reconstructions was evaluated using the following angle, $$\delta(E, \hat{E}) = arcos\left(\frac{|\langle \hat{E}(t) | E(t) \rangle|}{\sqrt{\langle \hat{E}(t) | \hat{E}(t) \rangle \langle E(t) | E(t) \rangle}}\right), \quad (23)$$

which is insensitive to the global phase (i.e., the third ambiguity of the field). In Eq. (23), $\hat{E}(t)$ and $E(t)$ are the original and reconstructed fields, respectively, and $\langle f(t)|g(t)\rangle = \int \overline{f(t)}g(t)dt$ stands for the inner product.

Figures 14A, 14B, 14C, 14D, 14E, 14F:
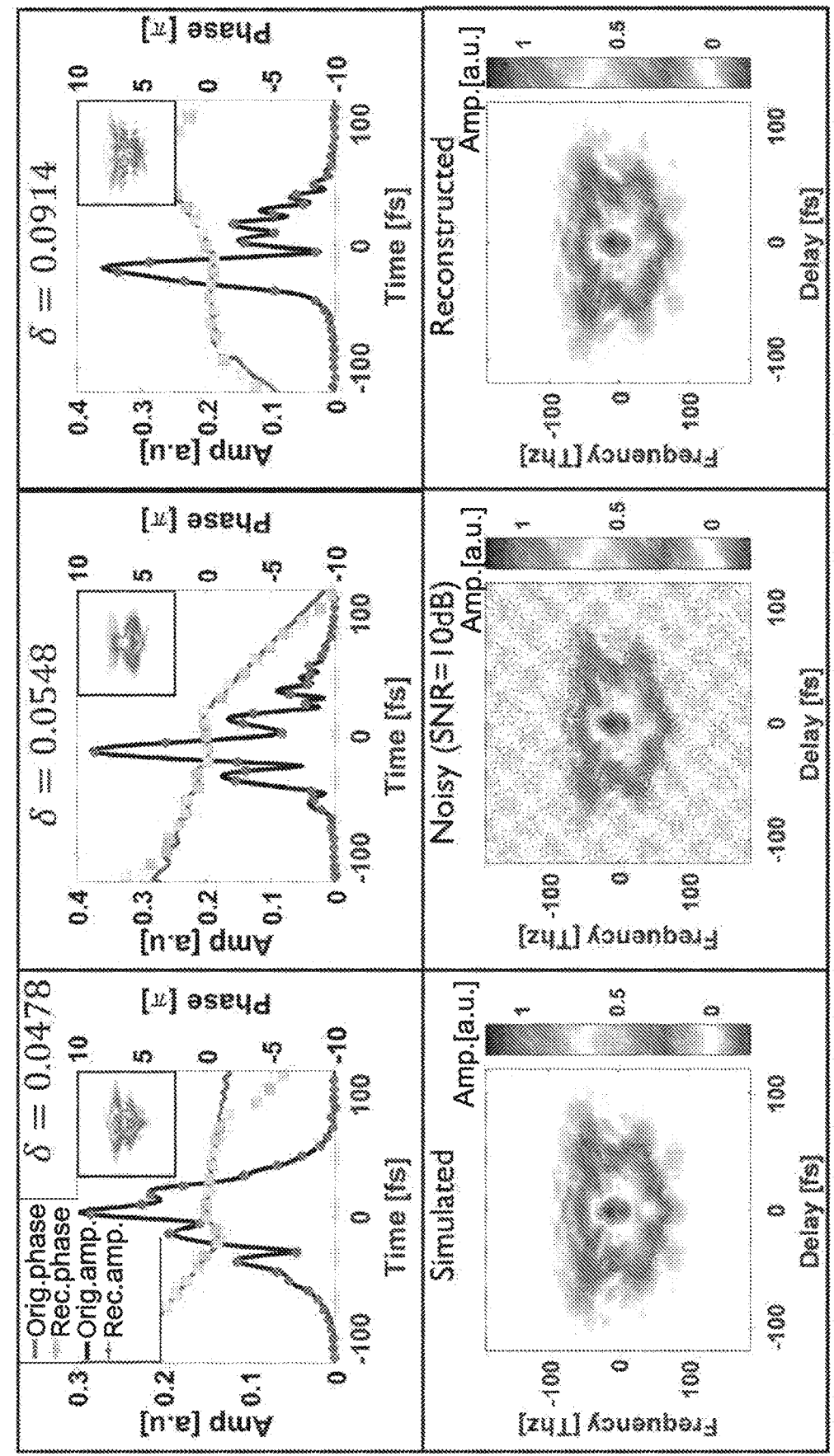
FIGS. 14A-14F shows a typical reconstruction of three pulses from a single noisy multiplexed FROG trace.

A typical reconstruction of three pulses from a single noisy multiplexed FROG trace is shown in FIGS. 14A-14F, illustrating the numerical example for characterization of three pulses from a single multiplexed FROG trace, where FIGS. 14A-14C show original (solid) and reconstructed (dashed) amplitudes and phases of the three simulated pulses, as well as calculated $\delta$; the inset in each graph is the corresponding FROG traces; FIG. 14D shows multiplexed FROG trace, corresponding to the sum of the individual FROG traces; FIG. 14E shows the multiplexed trace with white Gaussian noise at 10 dB SNR; and FIG. 14F reconstructed multiplexed trace by the algorithm while, for comparison, the finely reconstructed pulses are superimposed on the original pulses in FIGS. 14A-14C.

Figures 15A, 15B:
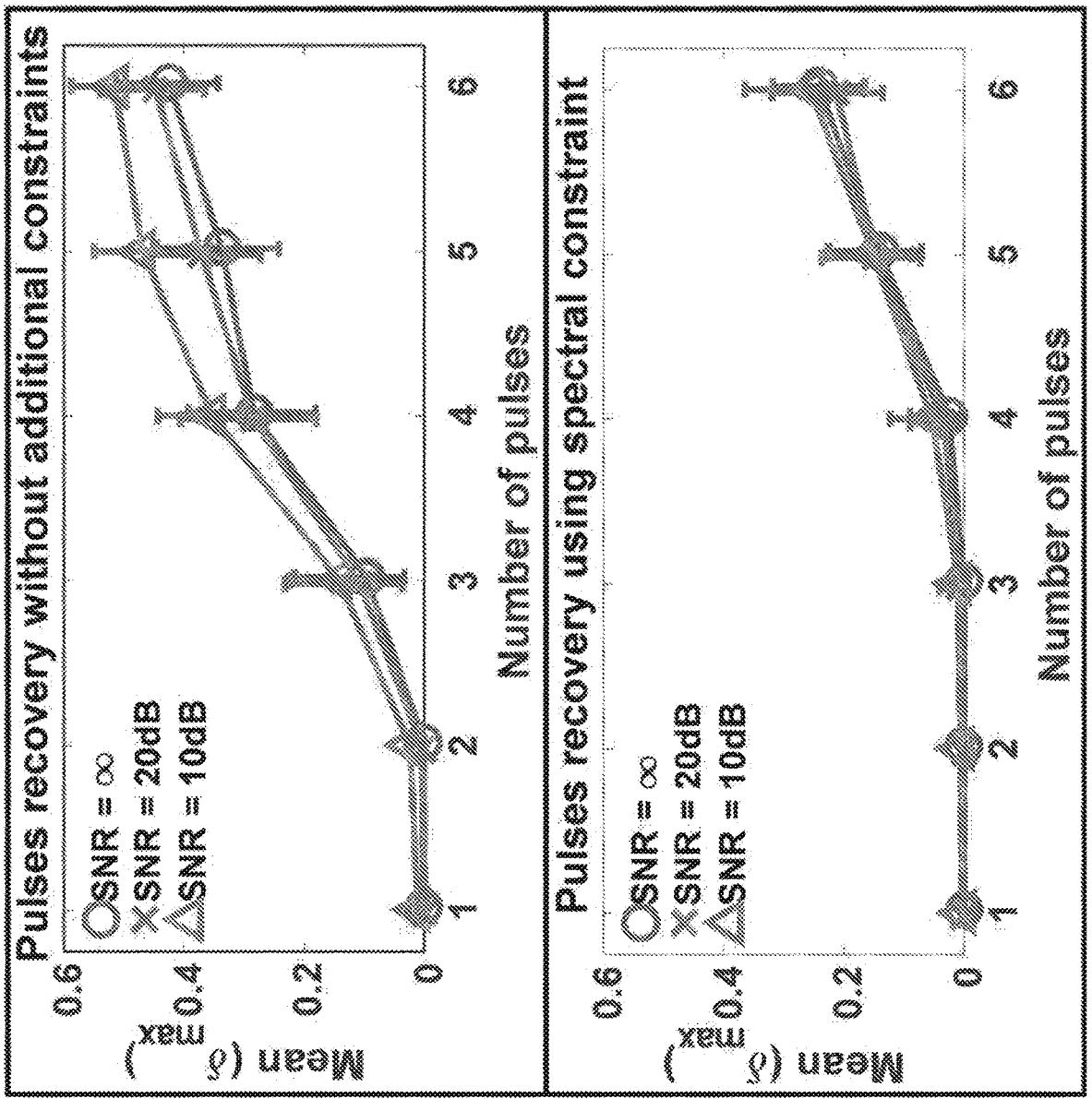
FIGS. 15A-15B show the mean of the maximal δ in a burst between the recovered and original pulses as a function of a number of pulses in the burst.

FIGS. 15A-15B show the mean of the maximal $\delta$ in a burst, i.e. $\delta_{max}$, (mean over 50 realizations of multiplexed FROG traces) between the recovered and original pulses as a function of a number of pulses in the burst. The figures present the w/o and w/the prior power spectrum option (additional steps in Eqs. (21) and (22)), respectively. When the power spectrum is not used, all the reconstructions of bursts with up to three pulses were fine ($\delta_{max}$<0.3 for all tested noise values). Applying the power spectrum option yielded fine reconstructions of all the bursts with up to 5 pulses.

The inventors have demonstrated two-pulse burst reconstruction from a multiplexed FROG trace experimentally. FIGS. 16A-16F is the experimental demonstration of multiplexed FROG, where FIG. 16A shows measured multiplexed FROG trace of a two-pulse burst, FIGS. 16B and 16C show measured FROG traces for each pulse in the burst, FIG. 16D shows reconstructed multiplexed FROG trace, and FIGS. 16E and 16F show reconstructed pulses using multiplexed FROG (dashed curves) and ordinary FROG (solid curves).

The burst was produced by splitting a ~35 fs pulse from ultrafast Ti-sapphire laser system and then sending one of the replicas through a pulse-shaper with a phase-only mask. The two pulses were then combined with approximately 5 ps delay between them. The burst was measured using a homemade scanning SHG FROG with a 2 fs delay step and 512 delay points, i.e. the total delay range is much smaller than the time interval between the pulses in the burst. Thus, each pulse in the burst interacts in the SHG crystal only with its replica and not with the other pulse. This way, the measured trace (FIG. 16A) corresponds to a multiplexed FROG trace of the burst. For comparison, the FROG traces of each pulse were measured by blocking the beamline of the other pulse (FIGS. 16B-16C). The reconstructed pulses using the individual FROG traces (solid curves) and the multiplexed FROG trace (dashed curves) are shown in FIGS. 16E and 16F. The angles (errors) between the reconstructed pulses are presented above each pair. This experiment demonstrates the validity of multiplexed FROG.

In the above examples, it was assumed that the number of pulses in the burst that produced the multiplexed FROG is known. The following is the description of an example of a method to deduce the number of pulses in the burst from the multiplexed FROG trace. The technique is based on applying the multiplexed FROG reconstruction algorithm for N=1, 2, 3 ... and identifying the knee in the curve describing the error on the trace reconstruction as a function of the number of pulses. A typical result of this method is illustrated in FIG. 17 (the original 3 pulses and multiplexed FROG trace were presented in FIGS. 14A-14C and FIG. 14E, respectively), which shows the reconstructed trace NMSE and pulse reconstruction $\delta_{max}$ as a function of assumed number of pulses in the burst (N=1, 2, ..., 5). As expected, the trace reconstruction NMSE is larger for N<3. For N≥3, the trace reconstruction NMSE is flat, at the expected value according to the noise level. Thus, the correct number of pulses corresponds to the knee of this curve. It should be noted that the quality of the burst reconstruction, $\delta_{max}$, is minimal only when the correct number of pulses, 3, is assumed, and is otherwise significantly larger. This result is intuitive when the number of assumed pulses is smaller than the correct one (N<3 in this case). When the number of assumed pulses is larger than the correct one (N>3), the algorithm converges to different solutions (with comparable trace reconstruction NMSE), which indicates that in this case the reconstruction problem is not unique.

As described above, a multiplexed FROG trace contains sufficient information to reconstruct several pulses. However, it does not include the required information needed to reconstruct their order or the inter-pulse delay. To overcome this limitation, the inventors used multiplexed blind FROG. Here, the trace corresponds to the sum of blind FROG traces, i.e. each trace is obtained by the interaction between a pair of unknown pulses, e.g. consecutive pulses in a burst.

FIGS. 18A-18H show an example for a multiplexed blind FROG trace concept and numerical reconstruction. Here, FIG. 18A show that each pulse in the burst interacts only with its consecutive pulses; FIG. 18B shows complete FROG trace of the burst, where the multiplexed blind FROG trace corresponds to the side lobe marked with the dashed red box; FIG. 18C shows the blind FROG traces that are the components of the multiplexed blind FROG; FIG. 18D shows the multiplexed blind FROG; FIG. 18E shows the multiplexed trace with white Gaussian noise at 10 dB SNR;

and FIGS. 18F-18H show original and reconstructed amplitudes and phases of the three simulated pulses Thus, the solid red line in FIG. 18A shows a burst of three pulses with time interval T between pulses. The central region of the complete FROG trace in FIG. 16B (around zero delay) corresponds to the above described multiplexed trace. The region around delay r=T (red dashed box in FIG. 18B) is a multiplexed blind FROG trace, which is the sum of blind FROG traces due to interactions between the $1^{st}$ and $2^{nd}$ pulses and $2^{nd}$ and $3^{rd}$ pulses (FIGS. 18C and 18D).

To characterize the burst from the multiplexed blind FROG trace, the multiplexed FROG algorithm is modified. First, Eq. (16) above is modified by producing the signal from each pulse's interaction with its neighboring pulses:

$$\psi_j^{(n)}(t) = E^{(n)}(t) E^{(n+1)}(t - s(j)\Delta \tau). \quad (24)$$

where n=1, 2, 3 . . . N–1 is a running index and N is the number of pulses in the burst. The next modification is different for n=2, 3 . . . N–1 pulses (these pulses interact with two different pulses) and the n=1, N pulses. In the first case, Eq. (20) is replaced by having the correction applied according to the difference between the signal and the corrected signal multiplied by a weight function based on the complex conjugates of $E_j^{(n+1)}(t)$ divided by its maximal intensity as well as the time shifted difference weighed by a similar weighing of $E_j^{(n-1)}(t)$:

$$E_{j+1}^{(n)}(t) = E_j^{(n)}(t) + \alpha \frac{E_j^{(n+1)*}(t - s(j)\Delta\tau)}{|E_j^{(n+1)}(t - s(j)\Delta\tau)|^2_{max}} (\tilde{\psi}_j^{(n)}(t) - \psi_j^{(n)}(t)) + \quad (25)$$

$$\alpha \frac{E_j^{(n-1)*}(t + s(j)\Delta\tau)}{|E_j^{(n-1)*}(t + s(j)\Delta\tau)|^2_{max}} (\tilde{\psi}_j^{(n-1)}(t + s(j)\Delta\tau) - \psi_j^{(n-1)}(t + s(j)\Delta\tau))$$

while in the second case it is replaced by either the first or second correction from Eq. (25)

$$E_{j+1}^{(N)}(t) = E_j^{(N)}(t) + \alpha \frac{E_j^{(N-1)*}(t + s(j)\Delta\tau)}{|E_j^{(N-1)}(t + s(j)\Delta\tau)|^2_{max}} \cdots \quad (26)$$

$$(\tilde{\psi}_j^{(N-1)}(t + s(j)\Delta\tau) - \psi_j^{(N-1)}(t + s(j)\Delta\tau)),$$

$$E_{j+1}^{(1)}(t) = E_j^{(1)}(t) + \alpha \frac{E_j^{(2)*}(t - s(j)\Delta\tau)}{|E_j^{(2)}(t - s(j)\Delta\tau)|^2_{max}} (\tilde{\psi}_j^{(1)}(t) - \psi_j^{(1)}(t)). \quad (19)$$

As in the case of regular blind FROG, an added constraint is required for a solution to be unique. Thus, the inventors have found that the application of the steps described by Eqs. (21) and (22) (i.e. applying a known power spectra to the pulses) is mandatory in this case. Applying the multiplexed blind FROG reconstruction algorithm, the 3-pulse burst is reconstructed as shown in FIG. 18A. FIG. 18E shows the multiplexed blind FROG with 10 dB SNR white Gaussian noise. By feeding this spectrogram to the reconstruction algorithm, the amplitudes, phases, pulse orders and accurate intervals of the three pulses were retrieved accurately (FIGS. 18F-18H).

Figure 19:
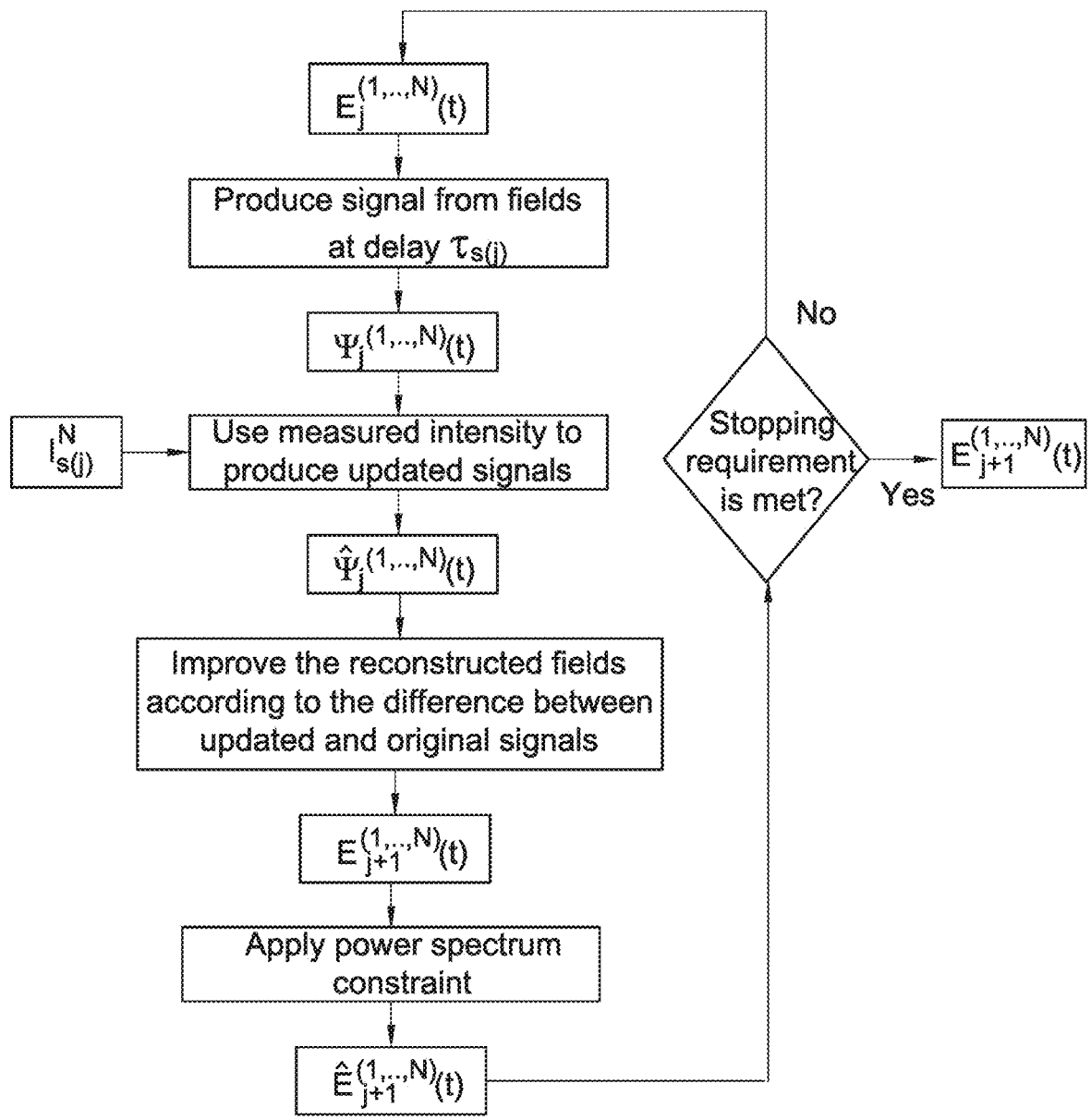
FIG. 19 shows a flow diagram exemplifying the multiplexed frog algorithm (both blind and regular) suitable for use in the present invention.

The above-described multiplexed frog algorithms (both blind and regular) can be visualized by flow diagram in FIG. 19.

The invention claimed is:

1. A ptychography system for imaging an object located in an object plane, the ptychography system comprising an optical system, and a detection device, the optical system comprising a single-shot ptychography arrangement configured and operable to create light response patterns from the object in the object plane on a pixel matrix of the detection device during the same exposure session of the detection device, wherein the optical system further comprises at least one light coding device configured and operable to apply at least one predetermined coding function to at least one of illuminating light and the light response of the object being collected, and said detection device is configured and operable with a predetermined duration of the exposure session during which the pixel matrix detects the collected light, such that image data indicative of the detected light during a single exposure session is in the form of a coded light response of the object being illuminated, said light coding device being configured and operable to produce the illuminating light in the form of a burst of pulses having a predetermined time pattern thereby producing the light response in the form of corresponding temporal frames of the multiplexed light responses detected by the pixel matrix during the same exposure session, thereby providing time-resolved imaging of the multiplexed light responses of the object during the single exposure session, thereby enabling imaging of a dynamic object.

2. The ptychography system of claim 1, wherein the light coding device is further configured and operable to produce said illuminating light having at least one of the following predetermined characteristics: pulse shape, spectral characteristics, polarization state, and spatial structure.

3. The ptychography system of claim 2, wherein the optical system comprises a two-dimensional array of optical windows located in an optical path of the burst of pulses, said array of optical windows comprising at least one of the following: a pinhole array, a spatial light modulator, an array of fibers, and a Micro Lens Array (MLA).

4. The ptychography system of claim 1, having at least one of the following configurations: (i) each pulse in said burst of pulses is different from other pulses in the burst in at least one of a pulse shape, spectral characteristics, polarization state, spatial structure; and (ii) the optical system comprises a two-dimensional array of optical windows or spatial light modulators located in an optical path of the burst of pulses.

5. The ptychography system of claim 1, further comprising a control system configured and operable to receive the image data indicative of the coded light response of the object during the exposure session, and utilize data indicative of the at least one predetermined coding function, to extract image data of the object.

6. The ptychography system of claim 1, wherein the single-shot ptychography system is configured and operable to produce structured light in the form of an array of illuminating beams partially overlapping at the object plane, such that the illuminating light having said predetermined time pattern forms a series of predetermined spatial patterns in the object plane; thereby providing that each spatial pattern is projected on a different region at the pixel matrix.

7. The ptychography system of claim 6, wherein the optical system comprises a pulse generator and a multiplexer producing together the illuminating light in the form of the burst of pulses, each pulse forming a spatial pattern in the object plane.

8. The ptychography system of claim 7, wherein the optical system has one of the following configurations: (a) the optical system comprises a light source and a two-dimensional array of multi-mode fibers, thereby producing different spatial modes of light separated in time, resulting in the train/burst of pulses exiting the array of fiber, where each pulse has a different spatial mode; and (b) the optical system comprises a light source and a single multi-mode fiber at the output of the light source providing different spatial modes separated in time; and the multiplexing assembly comprises a two-dimensional Micro Lens Array (MLA).

9. The ptychography system of claim 7, wherein the optical system comprises a light source and a single multi-mode fiber at the output of the light source providing different spatial modes separated in time; and the multiplexing assembly comprises a two-dimensional Micro Lens Array (MLA), the pulses having certain polarization, and the optical windows being polarization sensitive to encode each pulse into two polarizations with different spatial profiles, the optical system further comprising a birefringent media that separates the two polarizations into two separate pulses, each with different polarization.

10. The ptychography system of claim 7, wherein the optical system comprises a light source and a spatial light modulator at the output of the light source.

11. The ptychography system of claim 10, wherein the spatial light modulator has at least one of the following configurations: the spatial light modulator is configured and operable to affect light generated by the light source to produce the illuminating light in the form of the burst of pulses; and the spatial light modulator is configured and operable to affect pulsed light, such that each pulse has a spatial structure different from other pulses.

12. The ptychography system of claim 1, wherein the optical system comprises:
   a beam splitting arrangement comprising: at least one beam splitter, wherein each beam splitter divides the illuminating light into first and second spatially separated light components propagating along first and second arms of the illuminating channel, and the light coding device further comprising first and second coders in the first and second arms, respectively, the first and second light coders being configured and operable to apply to said first and second light components, respectively, predetermined first and second codings being different from one another in at least one of the following: pulse shape, spectral characteristics, and diffraction patterns; and
   a beam combining arrangement configured for combining first and second coded light components from the first and second arms to illuminate the object with light having different properties including said at least one of the pulse shape, spectral characteristics, and diffraction patterns.

13. The ptychography system according to claim 1, wherein the detection device has at least one of the following configurations: the detection device comprises a single detector having said pixel matrix; the detection device comprises two or more detectors, each having a two-dimensional array of pixels, forming together said pixel matrix.

14. The ptychography system of claim 1, wherein the detection device comprises two or more detectors, each having a two-dimensional array of pixels, forming together said pixel matrix; and
   the optical system has one of the following configurations: (1) comprises a beam splitting and beam combining arrangement, the beam splitting arrangement comprising at least one beam splitter, each dividing the light response being collected into first and second spatially separated light components, and the light coding device comprises at least one pair of first and second coders in the optical paths of the first and second light components, respectively, the first and second light coders being configured and operable to apply to said first and second light components, respectively, predetermined first and second codings being different from one another in at least one pulse shape/, spectral characteristics, and diffraction patterns, such that each of the first and second coded light components causes that different intensity patterns of sections of the respective light component arrive to different zones of the respective 2D pixel array; and (2) comprises a beam splitting arrangement, configured and operable for splitting the light response being collected from the object into K different arms (K≥2) light components propagating towards respective K 2D arrays of pixels; each of the K arms comprising a light coding device configured and operable to apply predetermined different spatial coding function to the respective light component of the light response being collected.

15. The ptychography system of claim 1, wherein the detection device comprises two or more detectors, each having a two-dimensional array of pixels, forming together said pixel matrix; and the optical system comprises a beam splitting arrangement, configured and operable for splitting the light response being collected from the object into K different arms (K≥2) light components propagating towards respective K 2D arrays of pixels; each of the K arms comprising a light coding device configured and operable to apply predetermined different spatial coding function to the respective light component of the light response being collected; and a Fourier transforming lens unit.

16. The ptychography system of claim 1, wherein the detection device comprises two or more detectors, each having a two-dimensional array of pixels, forming together said pixel matrix, the ptychography system further comprising a control system configured and operable to receive the image data indicative of the coded light response of the object during the exposure session, and utilize data indicative of the at least one predetermined coding function, to extract image data of the object.

17. A ptychography system of claim 1, further comprising a Frequency Resolved Optical Gating (FROG) system configured and operable for recovering multiple pulses from a single multiplexed FROG trace, and a beam splitting arrangement configured and operable to split the light response being collected into first and second light components propagating along two spatially separated paths to interact respectively, with the single-shot ptychography arrangement and FROG system.

18. A ptychography system for imaging an object located in an object plane, the ptychography system comprising:
   an optical system comprising: a single shot ptychography arrangement configured and operable to produce illuminating structured light to illuminate different but overlapping regions of an object in the object plane and create light response patterns from overlapped regions of the object simultaneously recorded in a single exposure on a pixel matrix of the detection device during the same exposure session of the detection device; and at least one light coding device configured and operable to apply at least one predetermined coding function to at least one of the illuminating light and the light response of the object being collected, and
   a detection device configured and operable with a predetermined duration of the exposure session during which the pixel matrix detects the collected light, such that image data indicative of the detected light during a single exposure session is in the form of a coded light response of the object being illuminated.

19. A ptychography system for imaging an object located in an object plane, the ptychography system comprising an optical system, and a detection device, the optical system comprising a single-shot ptychography arrangement configured and operable to create light response patterns from the object in the object plane on a pixel matrix of the detection device during the same exposure session of the detection device, wherein the optical system further comprises at least one light coding device configured and operable to apply at least one predetermined coding function to at least one of illuminating light and the light response of the object being collected, and said detection device is configured and operable with a predetermined duration of the exposure session during which the pixel matrix detects the collected light, such that image data indicative of the detected light during a single exposure session is in the form of a coded light response of the object being illuminated, said light coding device being configured and operable to produce the illuminating light having a predetermined time pattern thereby producing the light response in the form of corresponding temporal frames of the multiplexed light responses detected by the pixel matrix during the same exposure session, thereby providing time-resolved imaging of the multiplexed light responses of the object during the single exposure session, thereby enabling imaging of a dynamic object, said illuminating light being configured as structured light in the form of an array of illuminating beams partially overlapping at the object plane, such that the illuminating light having said predetermined time pattern forms a series of predetermined spatial patterns in the object plane; thereby providing that each spatial pattern is projected on a different region at the pixel matrix.

20. The ptychography system of claim 19, characterized by at least one of the following:
the system further comprises a control system configured and operable to receive the image data indicative of the coded light response of the object during the exposure session, and utilize data indicative of the at least one predetermined coding function, to extract image data of the object;
the optical system comprises a pulse generator and a multiplexer producing together the illuminating light in the form of the burst of pulses, each pulse forming a spatial pattern in the object plane;
the optical system comprises a light source and a spatial light modulator at the output of the light source; and
the detection device comprises a single detector having said pixel matrix.

21. The ptychography system of claim 19, wherein the optical system comprises a pulse generator and a multiplexer producing together the illuminating light in the form of the burst of pulses, each pulse forming a spatial pattern in the object plane, the optical system having one of the following configurations:
(a) the optical system comprises a light source and a two-dimensional array of multi-mode fibers, thereby producing different spatial modes of light separated in time, resulting in the train/burst of pulses exiting the array of fiber, where each pulse has a different spatial mode;
(b) the optical system comprises a light source and a single multi-mode fiber at the output of the light source providing different spatial modes separated in time; and the multiplexing assembly comprises a two-dimensional Micro Lens Array (MLA);
(c) the optical system comprises a light source and a single multi-mode fiber at the output of the light source providing different spatial modes separated in time; and the multiplexing assembly comprises a two-dimensional Micro Lens Array (MLA), the pulses having certain polarization, and the optical windows being polarization sensitive to encode each pulse into two polarizations with different spatial profiles, the optical system further comprising a birefringent media that separates the two polarizations into two separate pulses, each with different polarization.

22. The ptychography system of claim 19, wherein the optical system comprises a light source and a spatial light modulator at the output of the light source, the spatial light modulator having at least one of the following configurations: the spatial light modulator is configured and operable to affect light generated by the light source to produce the illuminating light in the form of the burst of pulses; and the spatial light modulator is configured and operable to affect pulsed light, such that each pulse has a spatial structure different from other pulses.

23. A ptychography system for imaging an object located in an object plane, the ptychography system comprising an optical system, and a detection device, the optical system comprising a single-shot ptychography arrangement configured and operable to create light response patterns from the object in the object plane on a pixel matrix of the detection device during the same exposure session of the detection device, wherein the optical system further comprises at least one light coding device configured and operable to apply at least one predetermined coding function to at least one of illuminating light and the light response of the object being collected, and said detection device is configured and operable with a predetermined duration of the exposure session during which the pixel matrix detects the collected light, such that image data indicative of the detected light during a single exposure session is in the form of a coded light response of the object being illuminated, wherein the optical system comprises a light source and a spatial light modulator at the output of the light source, the spatial light modulator having at least one of the following configurations: the spatial light modulator is configured and operable to affect light generated by the light source to produce the illuminating light in the form of the burst of pulses; and the spatial light modulator is configured and operable to affect pulsed light, such that each pulse has a spatial structure different from other pulses.

24. A ptychography system for imaging an object located in an object plane, the ptychography system comprising an optical system, and a detection device, the optical system comprising a single-shot ptychography arrangement configured and operable to create light response patterns from the object in the object plane on a pixel matrix of the detection device during the same exposure session of the detection device, wherein the optical system further comprises at least one light coding device configured and operable to apply at least one predetermined coding function to at least one of illuminating light and the light response of the object being collected, and said detection device is configured and operable with a predetermined duration of the exposure session during which the pixel matrix detects the collected light, such that image data indicative of the detected light during a single exposure session is in the form of a coded light response of the object being illuminated, wherein the optical system comprises:
a beam splitting arrangement comprising: at least one beam splitter, wherein each beam splitter divides the illuminating light into first and second spatially separated light components propagating along first and second arms of the illuminating channel, and the light coding device further comprising first and second coders in the first and second arms, respectively, the first and second light coders being configured and operable to apply to said first and second light components, respectively, predetermined first and second codings being different from one another in at least one of the following: pulse shape, spectral characteristics, and diffraction patterns; and a beam combining arrangement configured for combining first and second coded light components from the first and second arms to illuminate the object with light having different properties including said at least one of the pulse shape, spectral characteristics, and diffraction patterns.

25. A ptychography system for imaging an object located in an object plane, the ptychography system comprising an optical system, and a detection device, the optical system comprising a single-shot ptychography arrangement configured and operable to create light response patterns from the object in the object plane on a pixel matrix of the detection device during the same exposure session of the detection device, wherein the optical system further comprises at least one light coding device configured and operable to apply at least one predetermined coding function to at least one of illuminating light and the light response of the object being collected, and said detection device is configured and operable with a predetermined duration of the exposure session during which the pixel matrix detects the collected light, such that image data indicative of the detected light during a single exposure session is in the form of a coded light response of the object being illuminated, wherein the detection device has at least one of the following configurations: the detection device comprises a single detector having said pixel matrix; the detection device comprises two or more detectors, each having a two-dimensional array of pixels, forming together said pixel matrix.

26. A ptychography system for imaging an object located in an object plane, the ptychography system comprising an optical system, and a detection device, the optical system comprising a single-shot ptychography arrangement configured and operable to create light response patterns from the object in the object plane on a pixel matrix of the detection device during the same exposure session of the detection device, wherein the optical system further comprises at least one light coding device configured and operable to apply at least one predetermined coding function to at least one of illuminating light and the light response of the object being collected, and said detection device is configured and operable with a predetermined duration of the exposure session during which the pixel matrix detects the collected light, such that image data indicative of the detected light during a single exposure session is in the form of a coded light response of the object being illuminated, wherein the detection device comprises two or more detectors, each having a two-dimensional array of pixels, forming together said pixel matrix; and the optical system has one of the following configurations: (1) comprises a beam splitting and beam combining arrangement, the beam splitting arrangement comprising at least one beam splitter, each dividing the light response being collected into first and second spatially separated light components, and the light coding device comprises at least one pair of first and second coders in the optical paths of the first and second light components, respectively, the first and second light coders being configured and operable to apply to said first and second light components, respectively, predetermined first and second codings being different from one another in at least one pulse shape/, spectral characteristics, and diffraction patterns, such that each of the first and second coded light components causes that different intensity patterns of sections of the respective light component arrive to different zones of the respective 2D pixel array; and (2) comprises a beam splitting arrangement, configured and operable for splitting the light response being collected from the object into K different arms (K≥2) light components propagating towards respective K 2D arrays of pixels; each of the K arms comprising a light coding device configured and operable to apply predetermined different spatial coding function to the respective light component of the light response being collected.

27. A ptychography system for imaging an object located in an object plane, the ptychography system comprising an optical system, and a detection device, the optical system comprising a single-shot ptychography arrangement configured and operable to create light response patterns from the object in the object plane on a pixel matrix of the detection device during the same exposure session of the detection device, wherein the optical system further comprises at least one light coding device configured and operable to apply at least one predetermined coding function to at least one of illuminating light and the light response of the object being collected, and said detection device is configured and operable with a predetermined duration of the exposure session during which the pixel matrix detects the collected light, such that image data indicative of the detected light during a single exposure session is in the form of a coded light response of the object being illuminated, wherein the detection device comprises two or more detectors, each having a two-dimensional array of pixels, forming together said pixel matrix; and the optical system comprises a beam splitting arrangement, configured and operable for splitting the light response being collected from the object into K different arms (K≥2) light components propagating towards respective K 2D arrays of pixels; each of the K arms comprising a light coding device configured and operable to apply predetermined different spatial coding function to the respective light component of the light response being collected; and a Fourier transforming lens unit.

28. A ptychography system for imaging an object located in an object plane, the ptychography system comprising an optical system, and a detection device, the optical system comprising a single-shot ptychography arrangement configured and operable to create light response patterns from the object in the object plane on a pixel matrix of the detection device during the same exposure session of the detection device, wherein the optical system further comprises at least one light coding device configured and operable to apply at least one predetermined coding function to at least one of illuminating light and the light response of the object being collected, and said detection device is configured and operable with a predetermined duration of the exposure session during which the pixel matrix detects the collected light, such that image data indicative of the detected light during a single exposure session is in the form of a coded light response of the object being illuminated, wherein the detection device comprises two or more detectors, each having a two-dimensional array of pixels, forming together said pixel matrix, the ptychography system further comprising a control system configured and operable to receive the image data indicative of the coded light response of the object during the exposure session, and utilize data indicative of the at least one predetermined coding function, to extract image data of the object.

* * * * *